United States Patent
Fox et al.

(10) Patent No.: US 10,032,225 B1
(45) Date of Patent: Jul. 24, 2018

(54) AUGMENTED REALITY INSURANCE APPLICATIONS

(71) Applicant: Liberty Mutual Insurance Company, Boston, MA (US)

(72) Inventors: Michael Scott Fox, Boston, MA (US); Brian Stephen Piccolo, Boston, MA (US); Khamla Saenglongma, Boston, MA (US); Christopher Allen Capone, Boston, MA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 891 days.

(21) Appl. No.: 14/295,031

(22) Filed: Jun. 3, 2014

Related U.S. Application Data

(60) Provisional application No. 61/838,188, filed on Jun. 21, 2013.

(51) Int. Cl.
  *G06Q 40/08* (2012.01)
  *G06Q 30/06* (2012.01)
  *G06Q 20/32* (2012.01)

(52) U.S. Cl.
  CPC ............ *G06Q 40/08* (2013.01); *G06Q 20/32* (2013.01); *G06Q 30/06* (2013.01)

(58) Field of Classification Search
  None
  See application file for complete search history.

(56) References Cited

U.S. PATENT DOCUMENTS

| | | | |
|---|---|---|---|
| 4,567,359 | A | 1/1986 | Lockwood |
| 8,724,924 | B2 | 5/2014 | Nepomniachtchi |
| 2002/0055861 | A1 | 5/2002 | King |
| 2002/0090132 | A1 | 7/2002 | Boncyk |
| 2005/0261980 | A1 | 11/2005 | Hadi |
| 2006/0178180 | A1 | 8/2006 | Jung |
| 2007/0179867 | A1 | 8/2007 | Glazer |
| 2009/0102859 | A1 | 4/2009 | Athsani |
| 2010/0174564 | A1 | 7/2010 | Stender |
| 2011/0166893 | A1 | 7/2011 | McConnell |
| 2011/0292076 | A1 | 12/2011 | Wither |
| 2012/0246027 | A1 | 9/2012 | Martin |

FOREIGN PATENT DOCUMENTS

KR   10-2010-0053963 A   5/2010

OTHER PUBLICATIONS

US 7,970,635, 06/2011, Medina, III (withdrawn)
(Continued)

*Primary Examiner* — Robert R Niquette
*Assistant Examiner* — Joseph W. King
(74) *Attorney, Agent, or Firm* — Alston & Bird LLP

(57) ABSTRACT

Pieces of software and pieces of hardware are suitable for facilitating augmented reality, which dynamically augments or enhances (images or live video of) the real world with computer-generated data (e.g., graphics of virtual objects) to facilitate insurance applications. Through the use of a mobile device (e.g., phone, tablet, and eyewear), embedded computer into body, or desktop, the augmented reality applications are engineered to allow an insurer to enhance the experiences of customers and prospects across sales, service and claims.

13 Claims, 22 Drawing Sheets

(56) References Cited

OTHER PUBLICATIONS

Carney, E., et al., "The Future of Insurance Is Mobile," Forrester Research, Inc., Cambridge, Mass., Sep. 28, 2012, <http://www.miteksystems.com/files/mitek/docs/the_future_of_insurance_i.pdf> [retrieved Jun. 27, 2013], 32 pages.

Rabkin, B., "Making Augmented Reality a Reality Can Benefit Insurers," Ovum, London, Mar. 27, 2012, <http://ovum.com/2012/03/27/making-augmented-reality-a-reality-can-benefit-insurers/> [retrieved Jul. 9, 2013], 2 pages.

Pranatharthy, A.C., et al., "Augmented Reality in Financial Services—Moving From Services—Moving From Science Fiction to Commerical Opportunities," Jan. 29, 3013, InfoSys Limited, Bangalore, India, <http://www.infosys.com/industries/financial-services/white-papers/Documents/augmented-reality-financial-services.pdf> [retrieved Jun. 27, 2013], 12 pages.

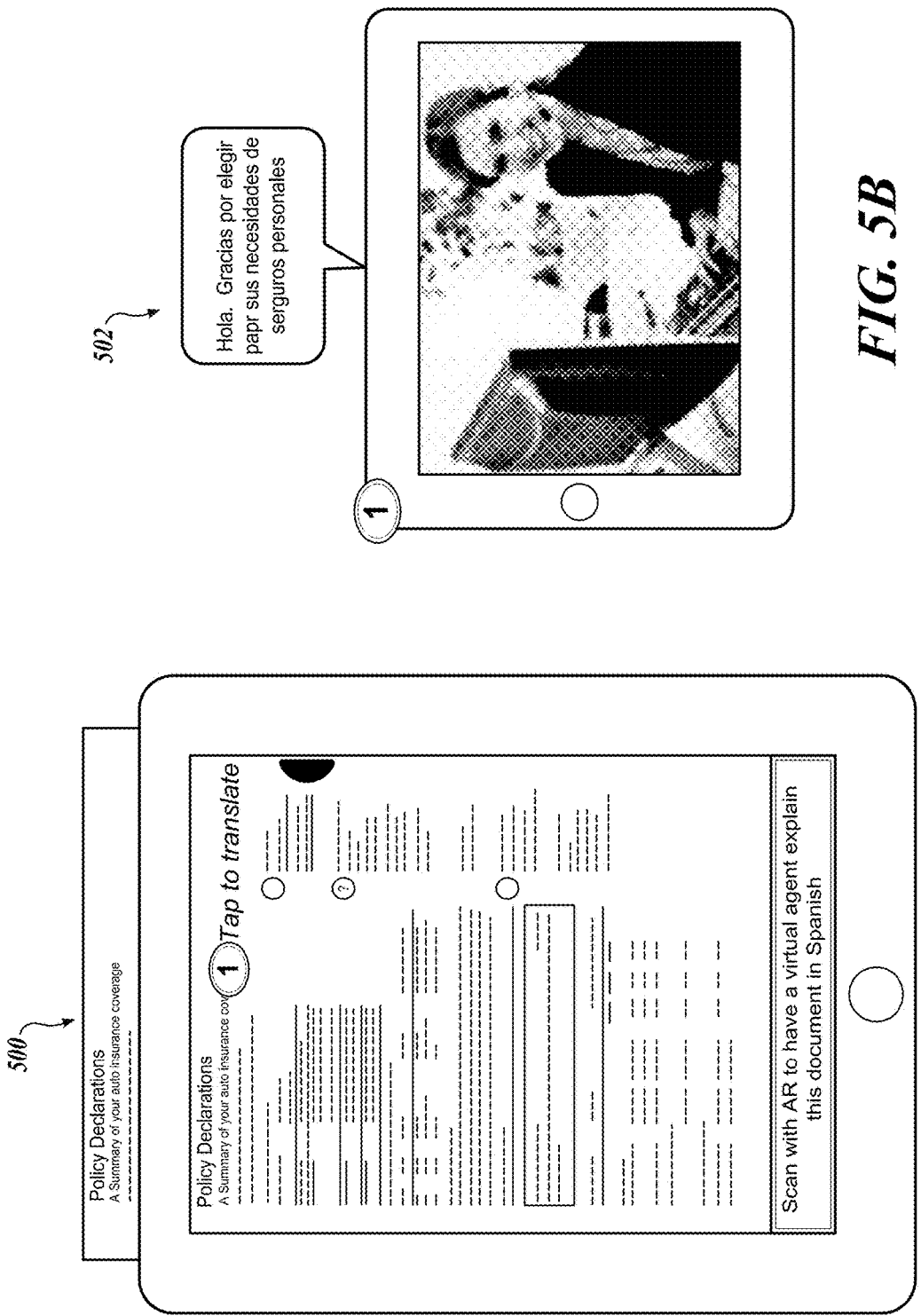

AUGMENTED REALITY INSURANCE APPLICATIONS

CROSS-REFERENCE TO RELATED APPLICATION

This application claims the benefit of U.S. Provisional Application No. 61/838,188, filed Jun. 21, 2013, which is incorporated herein by reference.

TECHNICAL FIELD

The subject matter is generally related to user interfaces, and more particularly, it relates to augmented reality applications in insurance.

BACKGROUND

Augmented reality is a real-time view of the world whose environmental presentations are augmented by computer-generated sensory input, such as sound, video, graphics, or GPS data. The augmentation facilitates the enhancement of one's present perception of reality by overlaying contents that are interactive. Augmentation is in semantic context with environmental elements, such as sports scores on a television during a game. With augmented reality, the information about the world of the user becomes interactive and can facilitate digital manipulation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aspect of the subject matter includes a system form which recites a system, comprising a mobile device, the hardware structure of which includes a digital camera, a display, tracking hardware, and input hardware. The digital camera is suitable for capturing a live view selected from a group consisting essentially of insured documents, competitor documents, property, and vehicle. The system further comprises insurance visual trigger hardware, the hardware structure of which is suitable for detecting interest points of the live view selected from a group consisting essentially of insured documents, competitor documents, property, and vehicle. The system also comprises an overlaying content database, the contents of which include applications for executing on the mobile device selected from a group consisting essentially of an application for an office locator, an application to quote and to allow purchasing of car insurance, an application for property insurance quote and purchase, an application for providing competitive information, an application for enhancing marketing material of an insurer by overlaying an interactive marketing experience on any of the insurer's physical marketing materials, an application for insurance document explanation and/or translation, an application for identifying insurance coverage gaps and communicating them to the user, an application for interacting with the physical insurance form with a mobile device in an appraisal scenario connected with a damaged vehicle, an application for locating a body shop, an application for providing property claims adjustments, and an application for insurance payment options.

Another aspect includes a method form which recites a method comprising displaying a live view through a digital camera of a mobile device, tracking the live view, triggering on insurance objects, receiving input when a user interacts with an augmentation over the live view, and facilitating the augmentation on a display of the mobile device. The augmentation is selected from a group consisting essentially of an application for an office locator, an application to quote and to allow purchasing of car insurance, an application for property insurance quote and purchase, an application for providing competitive information, an application for enhancing marketing material of an insurer by overlaying an interactive marketing experience on any of the insurer's physical marketing materials, an application for insurance document explanation and/or translation, an application for identifying insurance coverage gaps and communicating them to the user, an application for interacting with the physical insurance form with a mobile device in an appraisal scenario connected with a damaged vehicle, an application for locating a body shop, an application for providing property claims adjustments, and an application for insurance payment options.

An additional aspect includes a computer-readable medium form which recites a method comprising displaying a live view through a digital camera of a mobile device, tracking the live view, triggering on insurance objects, receiving input when a user interacts with an augmentation over the live view, and facilitating the augmentation on a display of the mobile device. The augmentation is selected from a group consisting essentially of an application for an office locator, an application to quote and to allow purchasing of car insurance, an application for property insurance quote and purchase, an application for providing competitive information, an application for enhancing marketing material of an insurer by overlaying an interactive marketing experience on any of the insurer's physical marketing materials, an application for insurance document explanation and/or translation, an application for identifying insurance coverage gaps and communicating them to the user, an application for interacting with the physical insurance form with a mobile device in an appraisal scenario connected with a damaged vehicle, an application for locating a body shop, an application for providing property claims adjustments, and an application for insurance payment options.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2C are pictorial diagrams illustrating archetypical user interfaces;

FIGS. 5A-5B are pictorial diagrams illustrating archetypical user interfaces;

DETAILED DESCRIPTION

Figure 1:
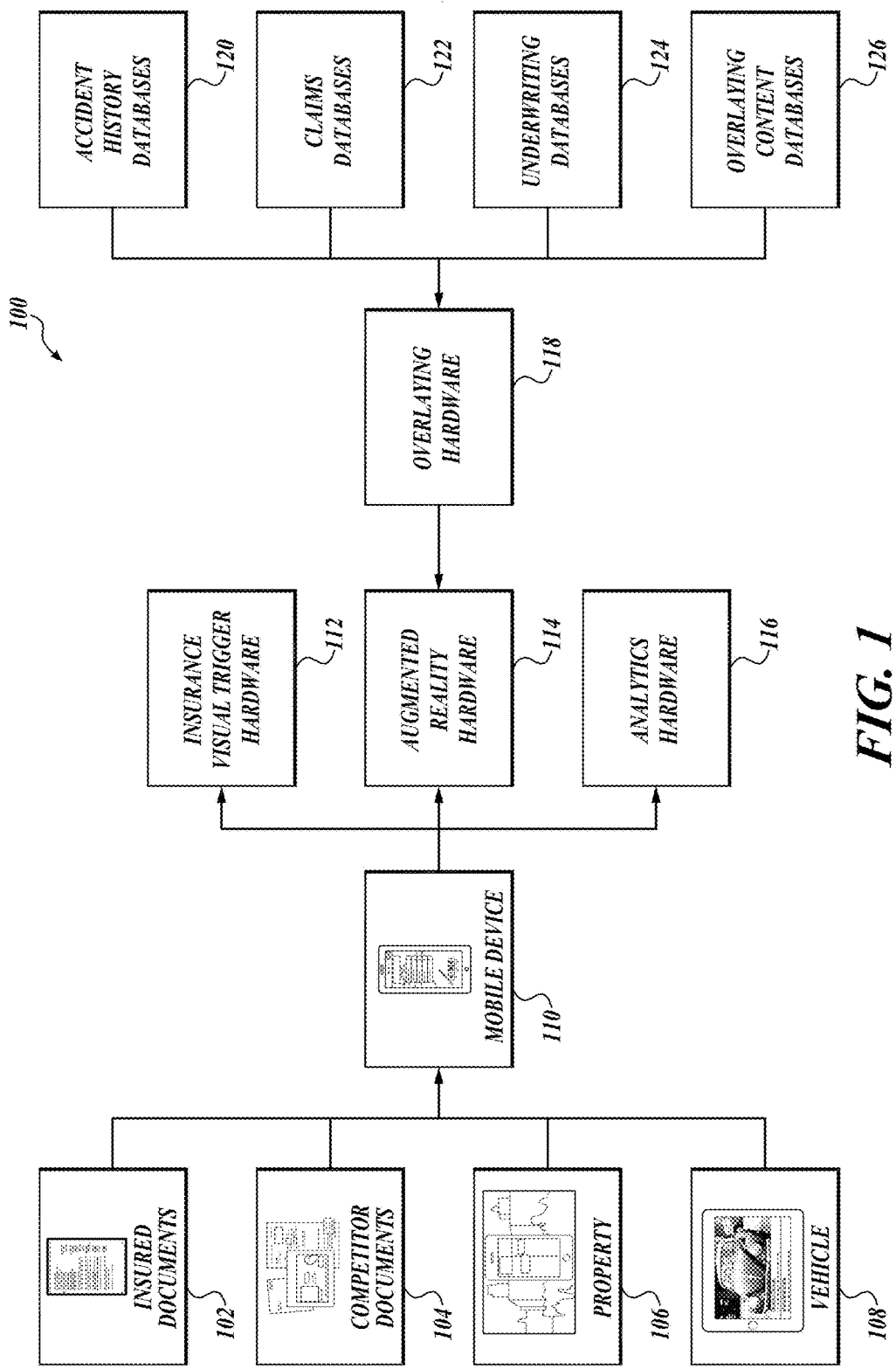
FIG. 1 is a block diagram illustrating an archetypical system with pieces of hardware.

Various embodiments engineer pieces of software and pieces of hardware suitable for facilitating augmented reality, which dynamically augments or enhances (images or live video of) the real world with computer-generated data (e.g., graphics of virtual objects). Through the use of a mobile device (e.g., phone, tablet, and eyewear including contact lenses), embedded computer into body, or desktop, the augmented reality applications are engineered to allow an insurer to enhance the experiences of customers and prospects across sales, service, and claims. Various embodiments facilitate, through an engineered augmented reality mobile or desktop application, the ability of an insurer to go beyond the physical world to enhance customer interactions with the insurer's products and services. Specifically, the insurer can serve the customer customized experiences to answer questions that previously required a phone call to a service or sales representative, entice customers to query for insurance quotes and binding of an insurance policy, encourage use of body shops whose quality is verified, help the insurer's adjusters/appraisers with the claims process, provide the tools needed for customer self-service in the claims process, and so on.

Generally, various embodiments are engineered to provide numerous augmented reality insurance applications. A first application is suitable for an office locator. By holding a mobile device up to its physical environment, the application is capable of displaying a logo to indicate that an insurer's offices are located in a given location. A second application has a capacity to quote and to allow purchasing of car insurance. With respect to this application, a prospective insured holds a mobile device up to a car. The application recognizes make, model, and year of the vehicle and analyzes personal information of the prospective insured that has already been entered into the application to provide an insurance quote. A third application is suitable for property insurance quote and purchase. This application allows a prospective insured to hold the mobile device up to a home, which enables the insurer through the application to provide the prospective insured with a property insurance quote. A fourth application is capable of providing competitive information. The prospective insured holds a mobile device to a competitor insurer's automobile or home application or policy declaration or insurance bill (all of which hereinafter is referred to as "physical form"). The application can launch an augmented reality experience using visual triggers on the physical form of the competitor insurer. The application may then capture data on the physical form to provide the prospective insured with an insurance quote in competition with the competitor insurer. A fifth application has a capacity to enhance marketing material of an insurer by overlaying an interactive marketing experience on any of the insurer's physical marketing materials, such as direct mail, magazine advertisements, billboards, and so on, to entice the prospective insurer to contact the insurer's agents or to purchase insurance online. A sixth application is suitable for insurance document explanation, identifying insurance coverage gaps and communicating them to the user and/or document translation.

This sixth application allows an insured to use a mobile device that hovers over an insurance document, such as a policy quote, an insurance application, an insurance declaration, an insurance bill, and so on, so as to cause the application to overlay messages, such as coverage information, limit information, explanation information, translation information, and so on. A seventh application includes enhancement of insurance document explanation and/or translation. In this application, the insured interacts with the physical insurance form with a mobile device in an appraisal scenario connected with a damaged vehicle. The insured uses a mobile device to interact with the damaged vehicle through which the application overlays estimates for damaged parts, time to repair, and even where to get the vehicle fixed. An eighth application has the capacity to allow the insured to locate a body shop. Using the application, the insured holds the mobile device up to its physical environment through which the application displays a logo for where the insurer's body shops are located on a particular street, for example. A ninth application has the capacity to provide property claims adjustments, especially in a scenario where property adjusters attend to a property loss. The property adjuster uses the application on a mobile device to capture the front of a house, including its number. Information about the insured's policy shows up on the screen of the mobile device of the property adjuster. The property adjuster captures the exterior of the house where the property loss occurred. The claims or property adjuster further captures the interior of the house. If available, the application presents previously captured information so as to allow comparison of the differences. The application, through object recognition processes in combination with valuation appraisal artificial intelligence, assists the property adjuster in identifying areas of loss and estimates the value of the total loss. A tenth application is suitable for insurance payment options. The application derives information from the insurer's system such as claims, underwriting, and so on, with communication linkage to a payment system. Using the application, the insured captures a home and its home number along with other biometric features that uniquely identify the insured. The application then presents information via augmented reality, such as policy order information with payment options.

FIG. 1 illustrates a system 100 in which pieces of hardware are engineered to facilitate augmented reality in insurance applications. These pieces of hardware include a display hardware (digital camera of a mobile device), tracking hardware (digital camera and/or other optical sensors, accelerometers, GPS, gyroscopes, solid state compasses, RFID, and wireless sensors, all of which are hardware pieces of the mobile device), input hardware (speech recognition systems that translate a user's spoken words into computer instructions, and gesture recognition systems that can interpret a user's movements, all of which are hardware pieces on the mobile device), and analyzing hardware (which is suitable for analyzing the sensed visual and other data to synthesize and position augmentations.)

A mobile device 110 is used to capture a live view of the world whose insurance environmental elements include insured documents 102, competitor documents 104, property 106, and vehicle 108. Through the mobile device 110, insurance augmentation is facilitated by an insurance visual trigger hardware 112, an augmented reality hardware 114, and analytics hardware 116. The insurance augmentation enhances one's perception of the insured documents 102, competitor documents 104, property 106, and vehicle 108. The insurance visual trigger hardware 112 is suitable for providing electronic triggering based on a pattern identified by the analytics hardware 116. For example, if the mobile device 110 were to capture an insured's bill, the insurance visual trigger hardware 112 may electronically trigger that a customer's bill has been detected so as to allow the system 100 to provide insurance augmentation. The augmented reality hardware 114 is capable of presenting user interfaces over the live view captured by the mobile device 110 through its camera. The analytics hardware 116 has the capacity to identify patterns of interest from images seen by the mobile device 110.

The system 100 integrates augmentations with insurance objects of interest in the real world as seen by the digital camera of the mobile device 110. The software of the system 100 derives real world coordinates, independent from the digital camera, from camera images. This is image registration using computer vision, the species of which is video tracking. Using visual odometry, the system 100 facilitates augmentation in two parts. First, the insurance visual trigger hardware 112 and/or the analytics hardware 116 detect interest points or fiduciary markers in the camera images. Feature detection methods like corner detection, blob detection, edge detection or thresholding and/or other suitable image processing methods can be used. The second stage is executed by the augmented reality hardware 114 to restore a real world coordinate system from the data obtained in the first stage.

A few embodiments detect insurance objects with known geometry (or fiduciary markers) present in the scene. For example, the visual trigger hardware 112 may recognize the insurer's documents 102 by detecting the logo and the title of the documents and so on. In some other embodiments, a three-dimensional structure should be predetermined, such as a wire model of an undamaged vehicle for comparison to a damaged vehicle. If part of the scene is unknown, simultaneous localization and mapping can map relative positions, which is likely when the mobile device 110 is capturing a street to locate a body shop of the insurer, for example. If no information about scene geometry is available, structure from motion methods like bundle adjustment are used. Mathematical methods used in the second stage include projective (epipolar) geometry, geometric algebra, rotation representation with exponential map, kalman and particle filters, nonlinear optimization, and robust statistics.

A piece of overlaying hardware 118 uses accident history databases 120, claims databases 122, underwriting databases 124, and overlaying content databases 126 to provide semantic context information in connection with the insurance environmental elements 102-108 to provide the insurance applications or user interfaces. With augmented insurance applications, the information about the insured documents 102, the competitor documents 104, property 106, and vehicle 108 become interactive and a user can facilitate digital manipulation or interaction.

Figures 2A, 2B, 2C:
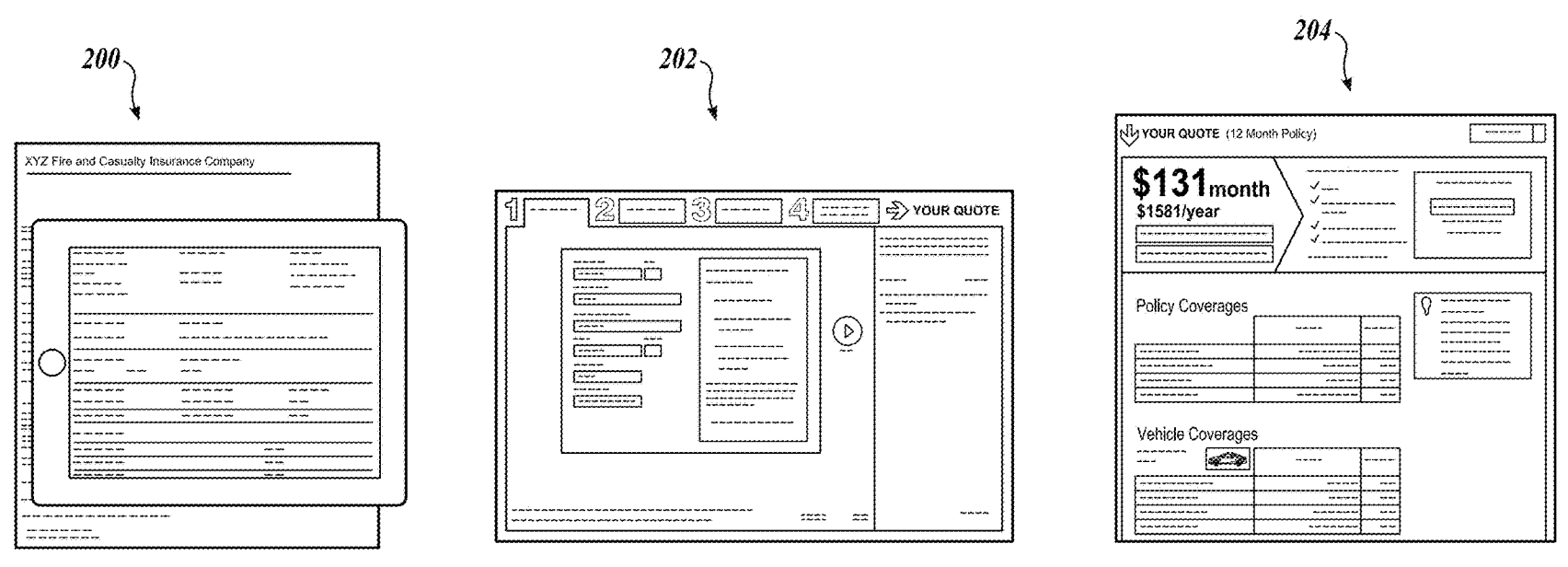

FIG. 2A presents an augmented reality context 200 in which a mobile device captures a live view of either an insured document 102 or a competitor document 104. The system 100 uses the insurance visual trigger hardware 112 as well as the analytics hardware 116 to capture data and populate various database fields in a piece of user interface 202 for confirmation by the user. See FIG. 2B. Once confirmed, the information captured by the piece of user interface 202 can be used in an insurance quoting application, such as an insurance quoting application 204. See FIG. 2C.

Figures 3A, 3B, 3C:
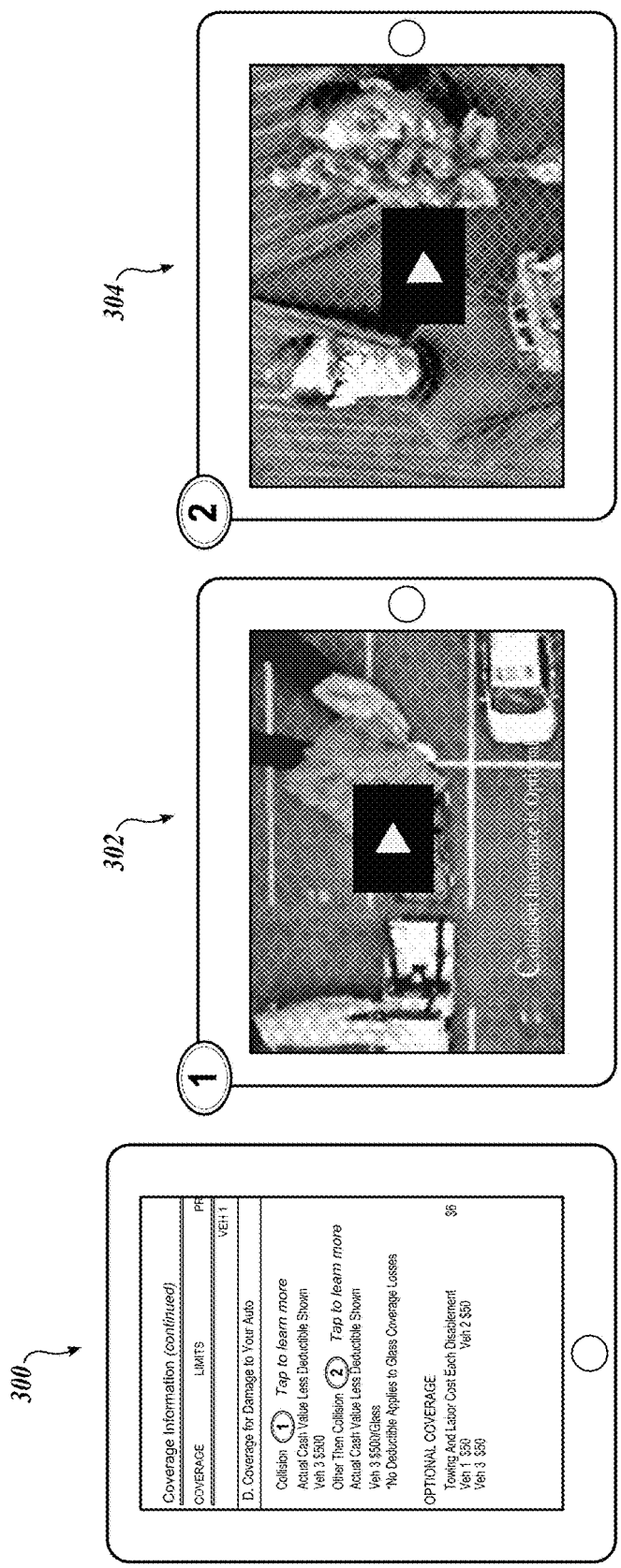
FIGS. 3A-3C are pictorial diagrams illustrating archetypical user interfaces.

FIG. 3A illustrates an augmented reality context 300 in which a mobile device captures a live view of an insured document 102, which is a policy declaration as detected by the insurance visual trigger hardware 112. The augmented reality hardware 114 overlays content over the mobile device 110 so as to allow explanation of insurance terms that may not be clear to the user. More specifically, the augmented reality presents two insurance user interface elements, one being a numerical one surrounded by a red circle, and the other insurance user interface element appearing as a numeric number two enclosed by another red circle. Both insurance user interface elements may be tapped by the user to navigate to further user interfaces that explain the insurance terms. For example, if the first insurance user interface element were to be tapped in connection with the insurance term "collision," a user interface screen 302 is presented on the mobile device 110 to further explain the insurance term "collision" to the user. See FIG. 3B. If, instead, the user were to tap on the second insurance user interface element, a user interface screen 304 is presented to the user on the mobile device 110 to explain that particular insurance term "Other Than Collision". See FIG. 3C.

Figure 4B:
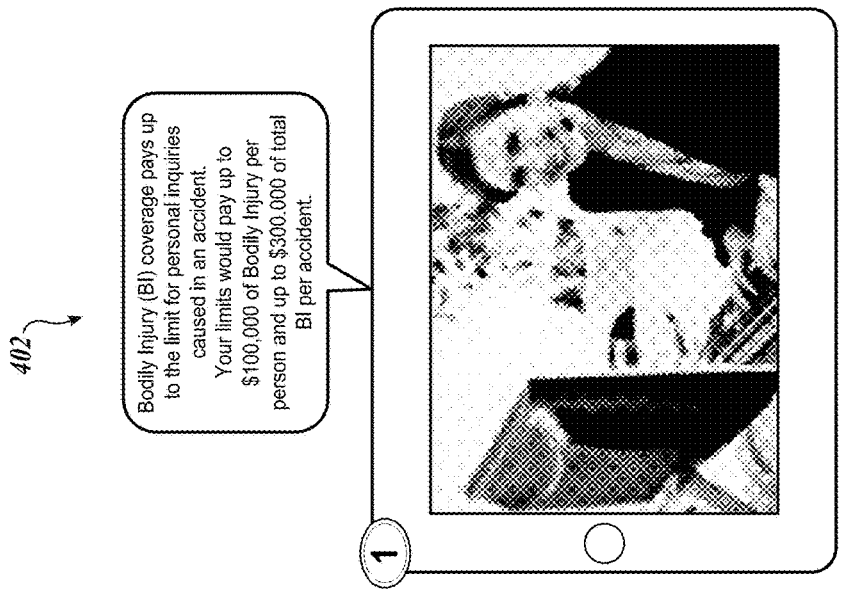
FIGS. 4A-4B are pictorial diagrams illustrating archetypical user interfaces.
Figure 4A:
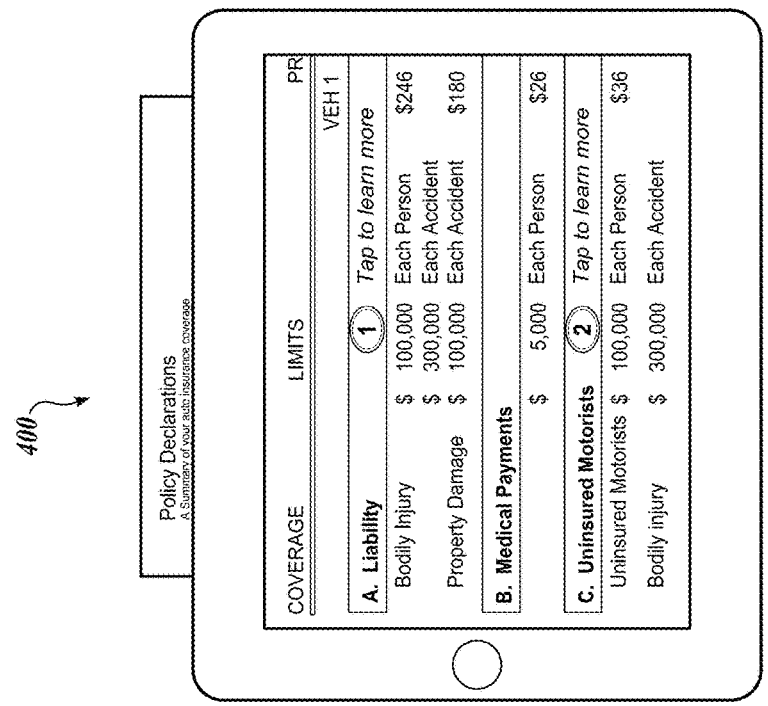

FIG. 4A illustrates an augmented reality context 400 in which the mobile device 110 captures a live view of an insured document 102, such as a policy declaration. Using the insurance visual trigger hardware 112, the system 100 detects a desire of the user for further explanation of coverage limits using the analytics hardware 116. Two insurance user interface elements are presented. The first is a first insurance user interface element appearing as a numeric 1 enclosed by a red circle, which is tappable by the user. The second insurance user interface element is a numeric 2 enclosed by another red circle, which is also tappable by the user to navigate to further user interfaces. If the user were to tap on the first user interface element, an insurance user interface screen 402 is presented on the mobile device 110 in which it is explained that "bodily injury (BI) coverage pays up to the limit for personal injuries caused in an auto accident. Your limits would pay up to $100,000 bodily injury per person and up to $300,000 total BI per accident." See FIG. 4B.

FIG. 5A illustrates an augmented reality context 500 in which the mobile device 110 captures a live view of the insured document 102, which is a policy declaration. The system 100 may use the insurance visual trigger hardware 112, as well as the analytics hardware 116 to determine that the user is a non-English speaker. If so, a first insurance user interface element is presented in which a numeric 1 enclosed by a red circle is presented, which is tappable by a user. If the user were to tap the first insurance user interface element, a user interface screen 502 is presented in which portions of the insured document 102 are translated into the language of the user, such as Spanish: "Hola. Gracias por elegir! para sus necesidades de seguros personales." See FIG. 5B.

Figure 6B:
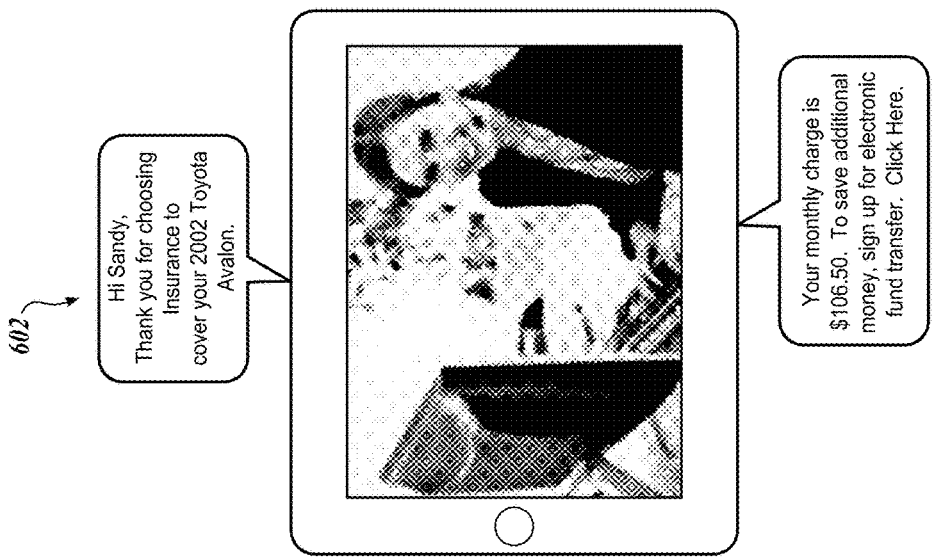
FIGS. 6A-6B are pictorial diagrams illustrating archetypical user interfaces.
Figure 6A:
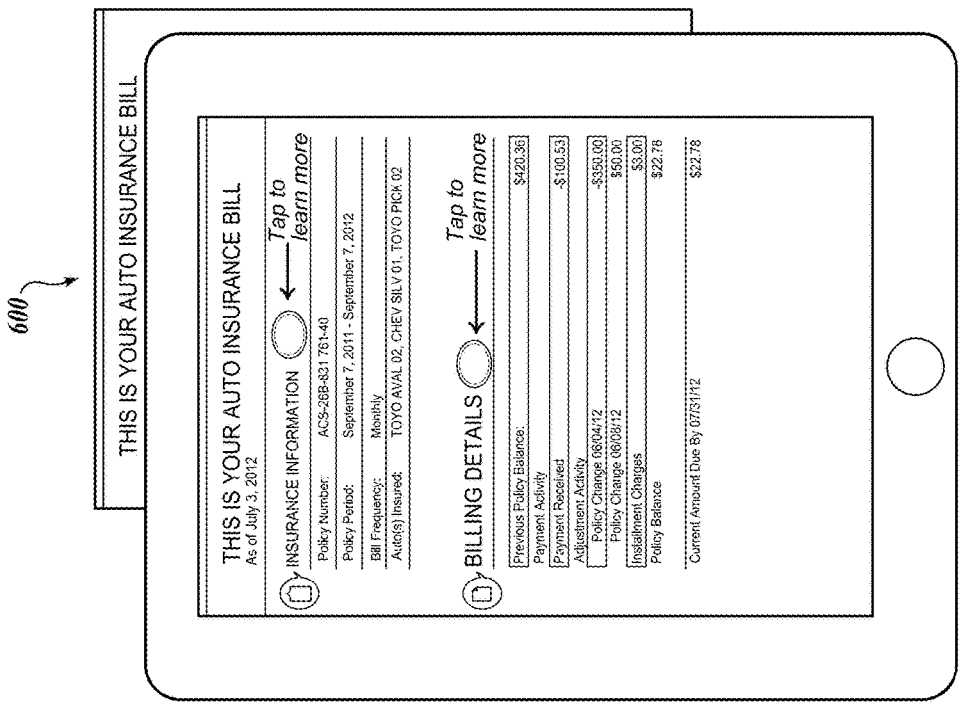

FIG. 6A illustrates an augmented reality context 600 in which the mobile device 110 captures a live view of the insured document 102, which in this instance is an auto insurance bill. The system 100 uses the insurance visual trigger hardware 112 and the analytics hardware 116 to detect that it is an auto insurance bill and provides an augmented reality through the augmented reality hardware 114 in which various insurance user interface elements are presented to explain the auto insurance bill to the user. Two insurance user interface elements are presented. The first is a red circle appearing near the textual description "insurance information," which can be tapped by the user to learn more about the "insurance information." The second insurance user interface element appears as a red circle next to the textual description "billing details," which is tappable by the user to learn additional information about it. An insurance screen 602 is presented when one of the insurance user interface elements is tapped by the user. Exemplary message appearing in the user interface screen 602 includes: "Hi Sandy, thank you for choosing insurance to cover your 2002 Toyota Avalon. Your monthly charge is $106.50. To save additional money, sign up for electronic funds transfer. Click here." See FIG. 6B.

Figure 7B:
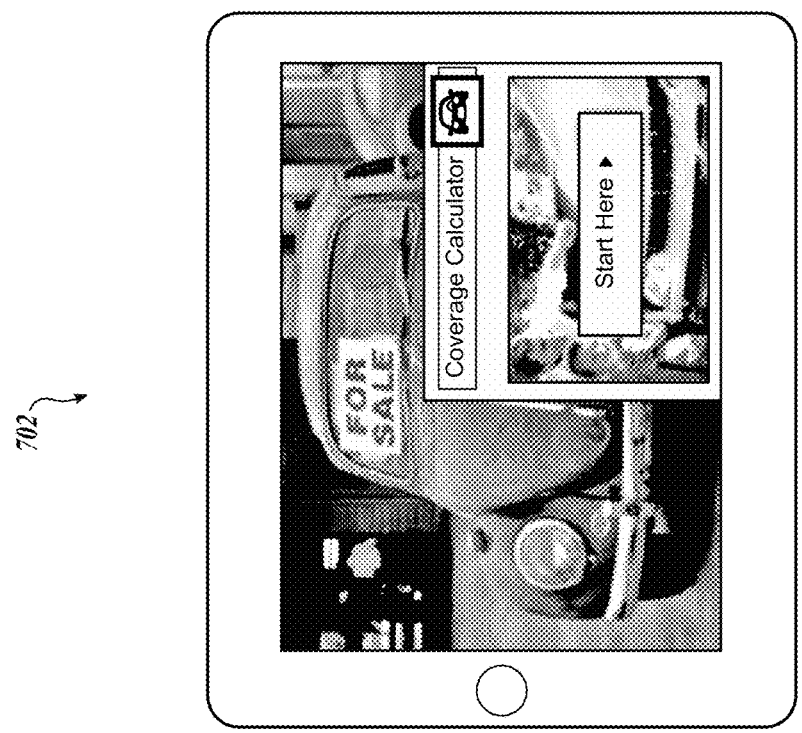
FIGS. 7A-7B are pictorial diagrams illustrating archetypical user interfaces.
Figure 7A:
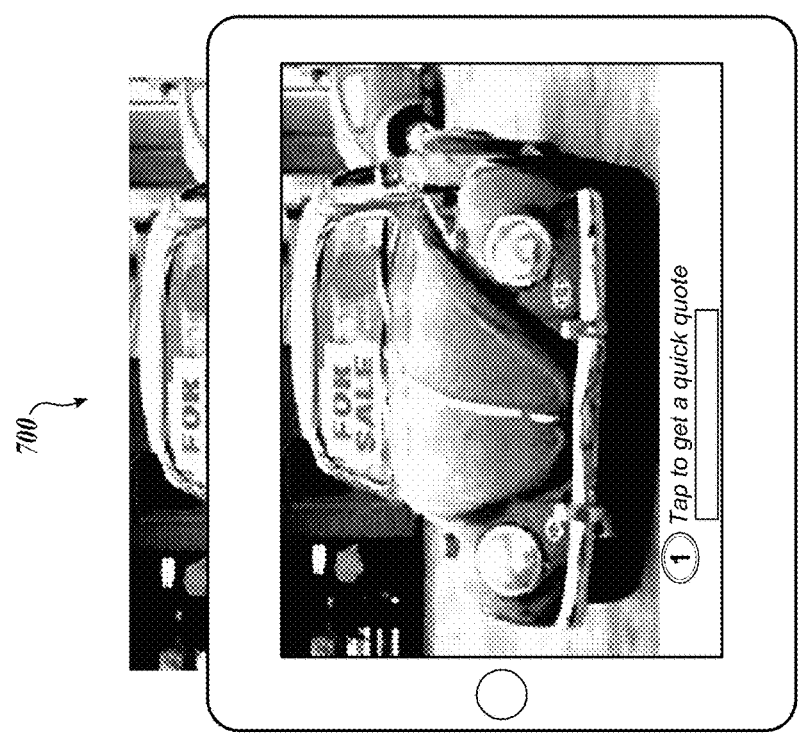

FIG. 7A illustrates an augmented reality context 700 in which the mobile device 110 captures a live view of the vehicle 108. The insurance visual trigger hardware 112 of the system 100 determines that it is a vehicle that the mobile device 110 captures and uses the analytics hardware 116 to determine that the user wishes to see an insurance quote in connection with the purchasing of the prospective vehicle 108. The augmented reality hardware 114 is used to overlay an insurance user interface element appearing as a numeric one enclosed by a red circle, which is followed by the textual description "Tap to get a quick quote," and which is tappable by the user to cause an insurance quote to be presented. FIG. 7B illustrates a user interface screen 702 on the mobile device 110 in which an insurance quote process is initiated.

Figures 8A, 8B:
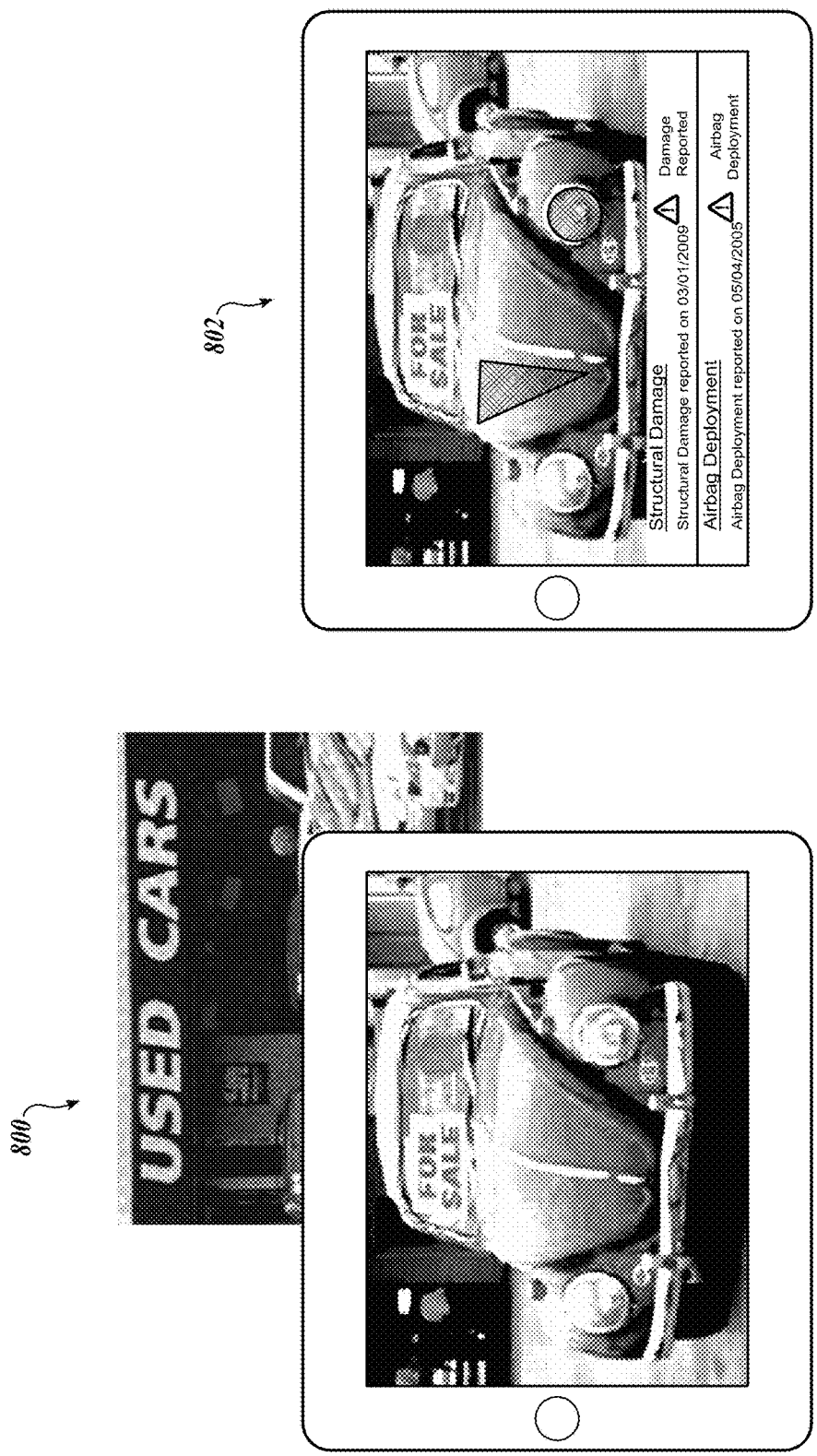
FIGS. 8A-8B are pictorial diagrams illustrating archetypical user interfaces.

FIG. 8A illustrates an augmented reality context 800 in which the mobile device 110 captures a live view of the vehicle 108 that the user is considering purchasing. The insurance visual trigger hardware 112, together with the analytics hardware 116 may access the accident history databases 120 and/or claims databases 122 to present to the user a history of accidents, if any, regarding the vehicle 108. FIG. 8B illustrates a user interface screen 802 in which overlaying the vehicle 108 are insurance user interface elements that indicate a location of where accidents have occurred on portions of the vehicle 108. These insurance user interface elements appear as yellow polygons, the areas of which indicate the extent and location of the damage to the vehicle 108. Textual descriptions appear on the user interface screen 802 to further explain the accident, such as structural damage or airbag deployment. For example, a first yellow polygon appears as a triangle over the hood of the vehicle 108 indicating the location of damage. As another example, a second yellow polygon appears as a circle over one of the headlights of the vehicle 108 indicating the location of damage.

Figure 9A:
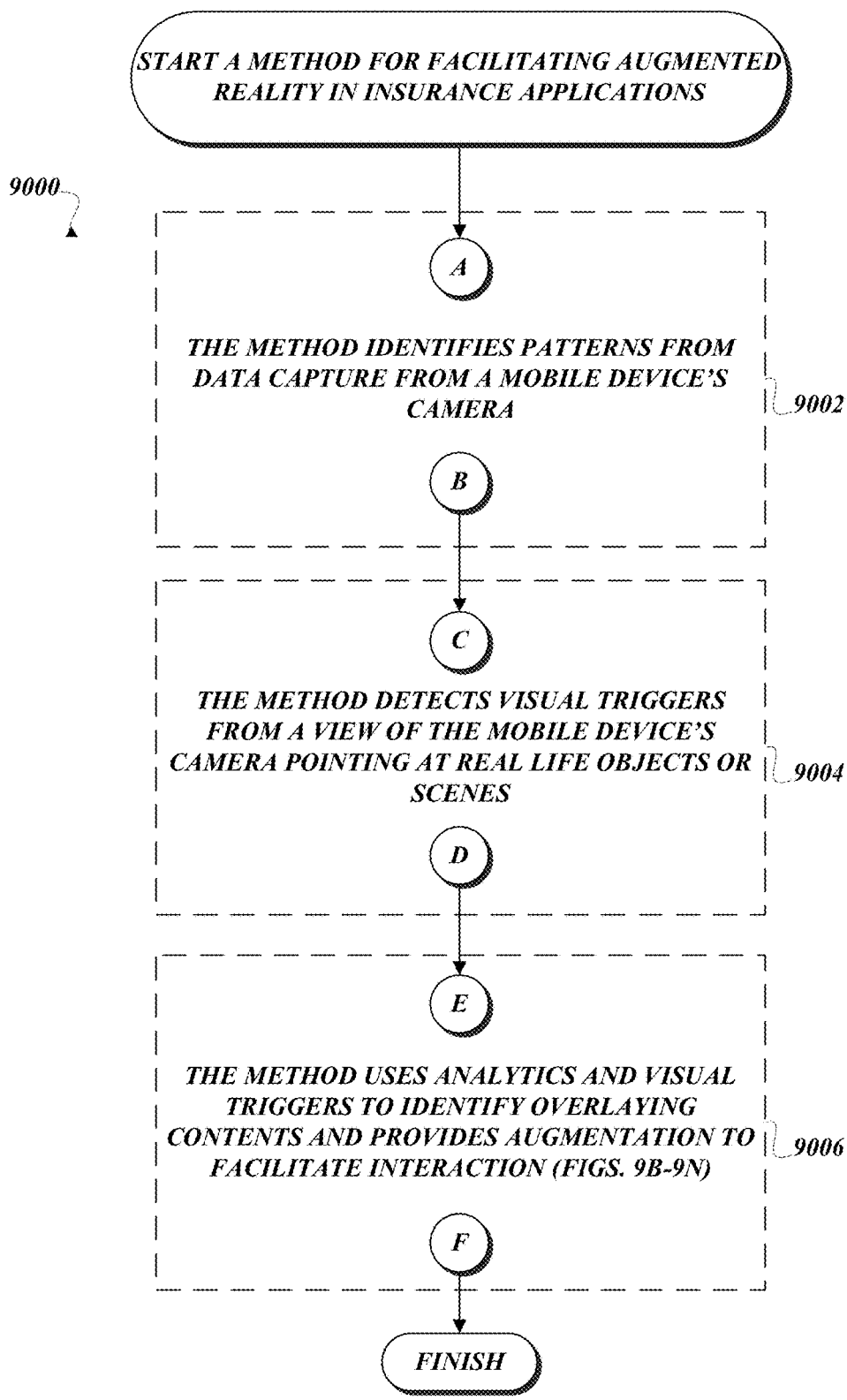
FIGS. 9A-9N are process diagrams implementing an archetypical method for facilitating augmented reality in insurance applications.
Figure 9B:
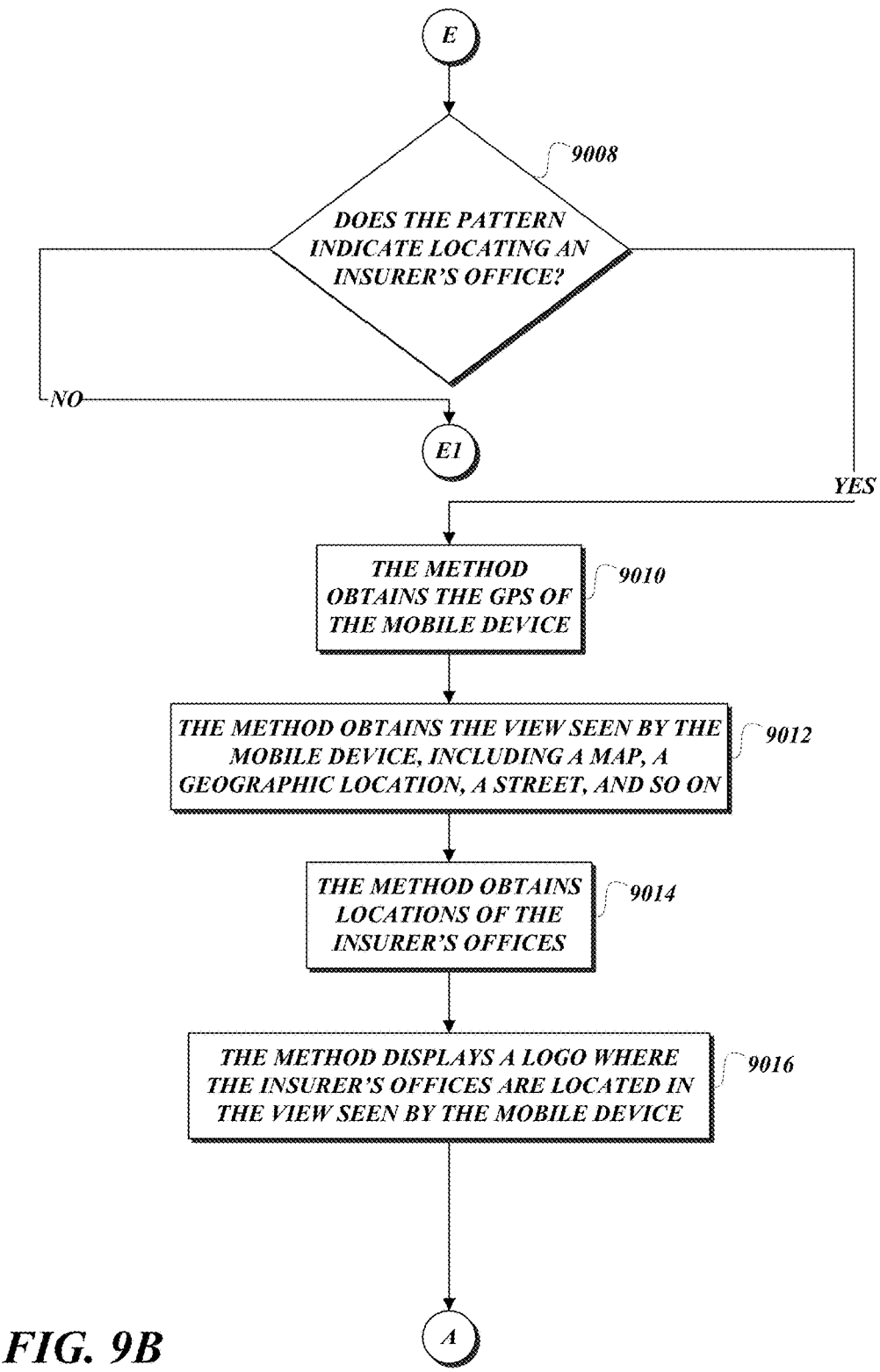
Figure 9C:
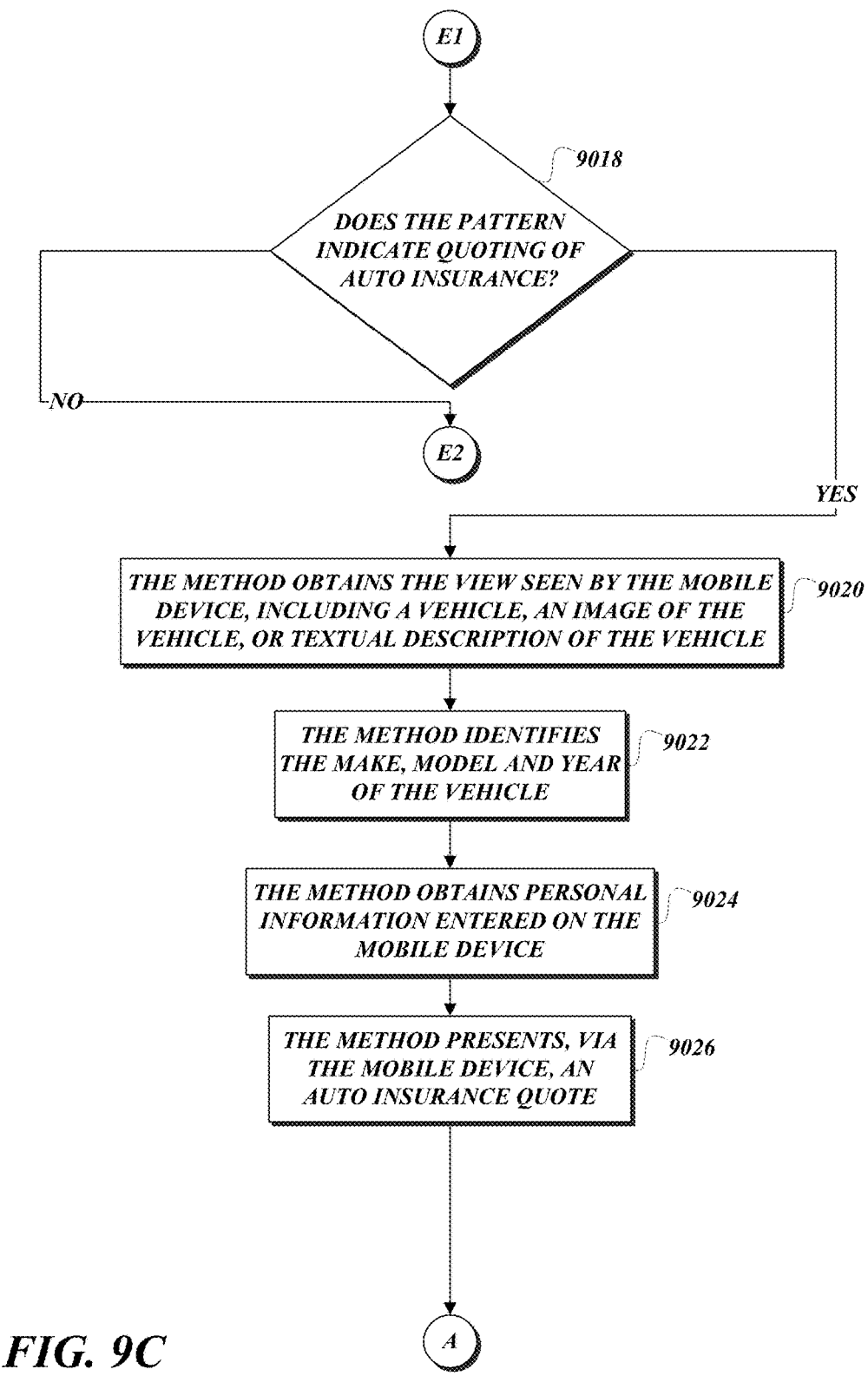
Figure 9D:
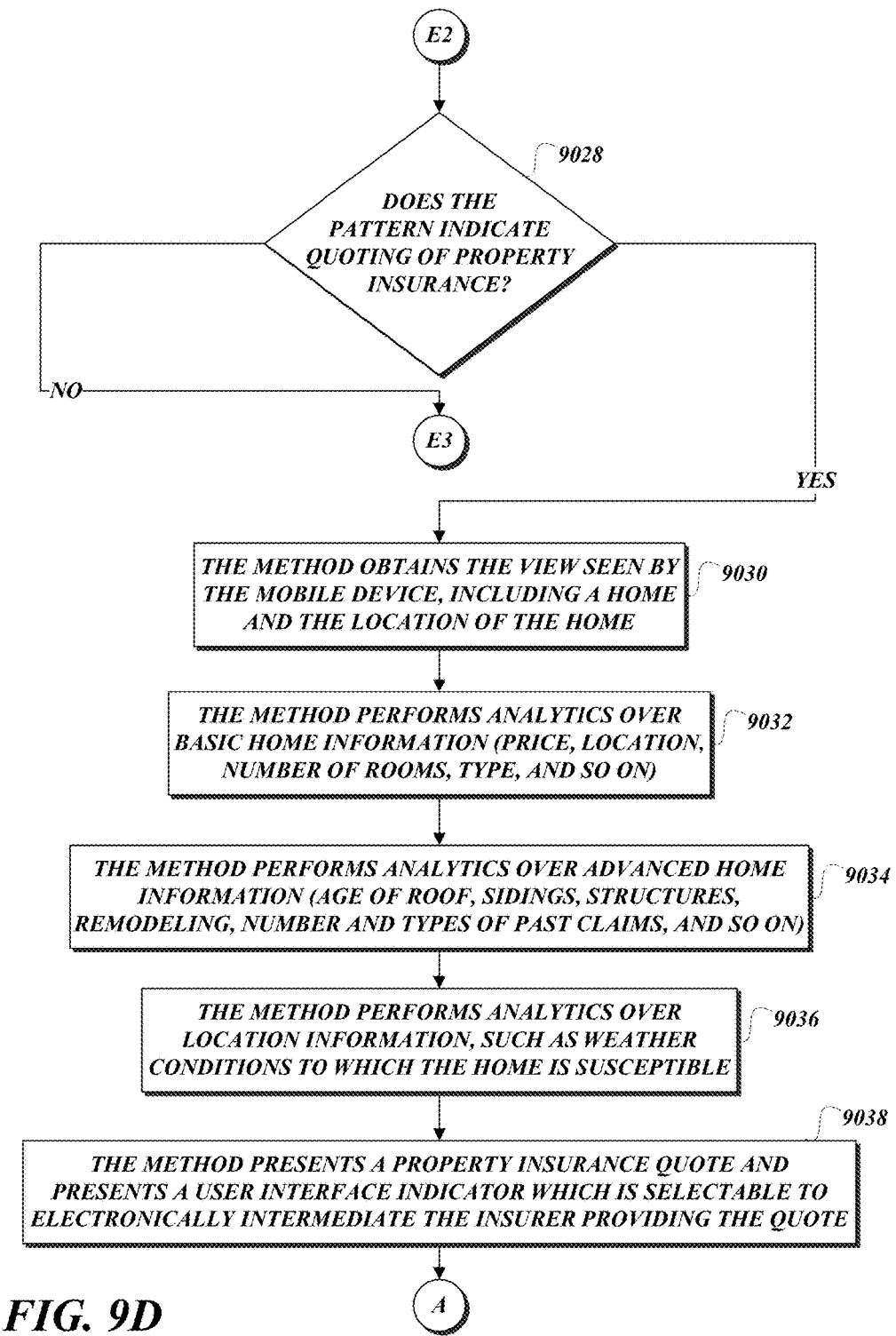
Figure 9E:
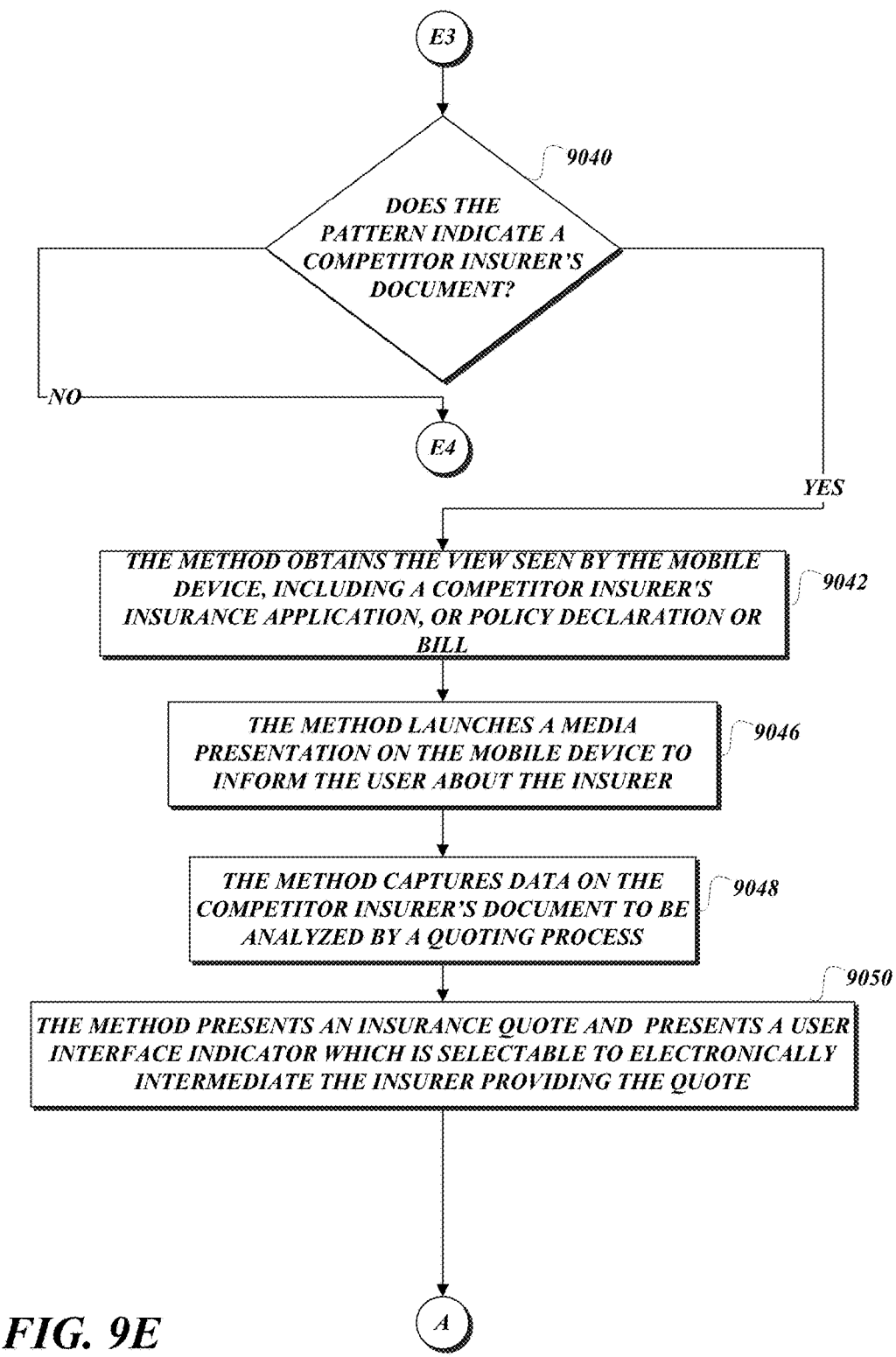
Figure 9F:
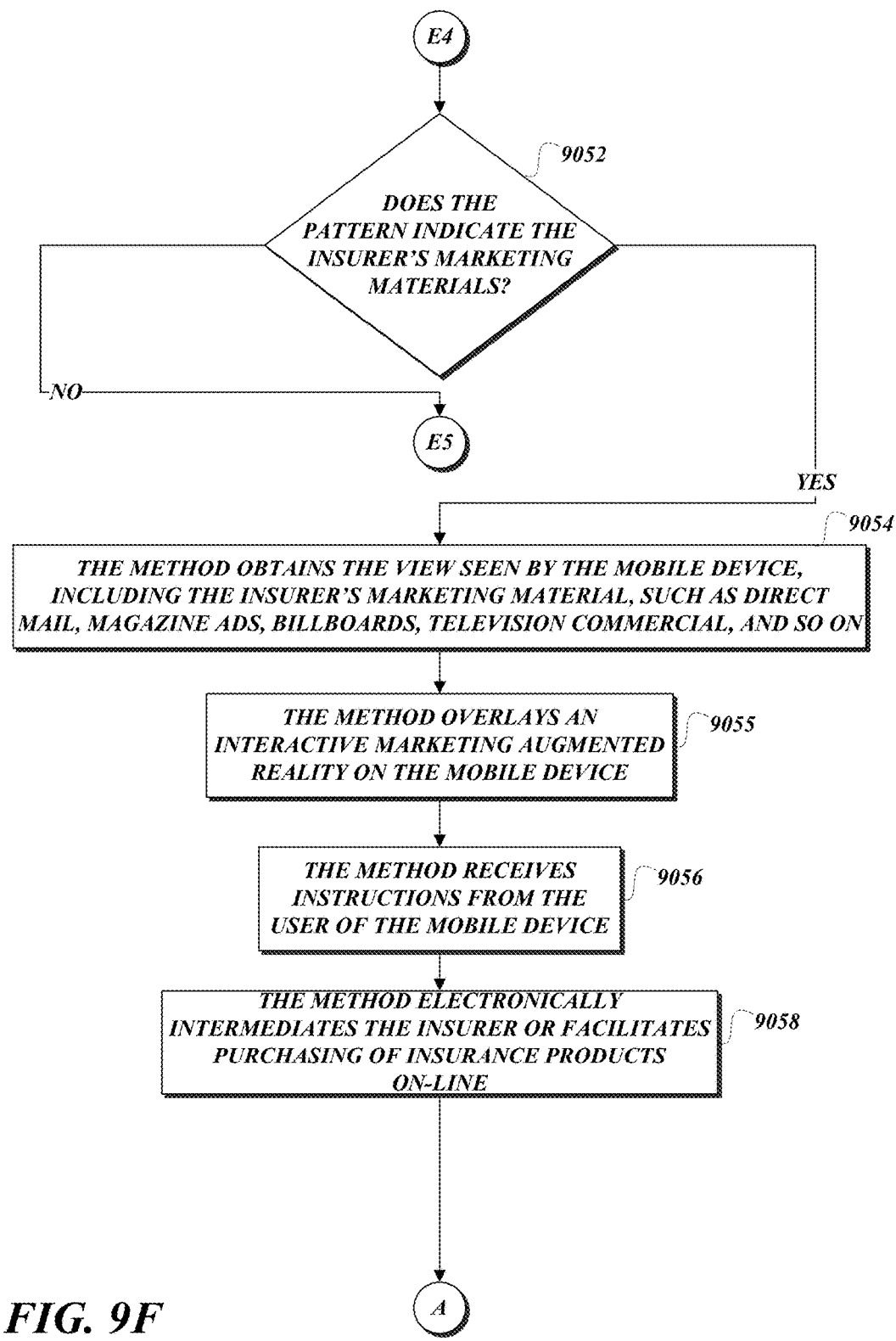
Figure 9G:
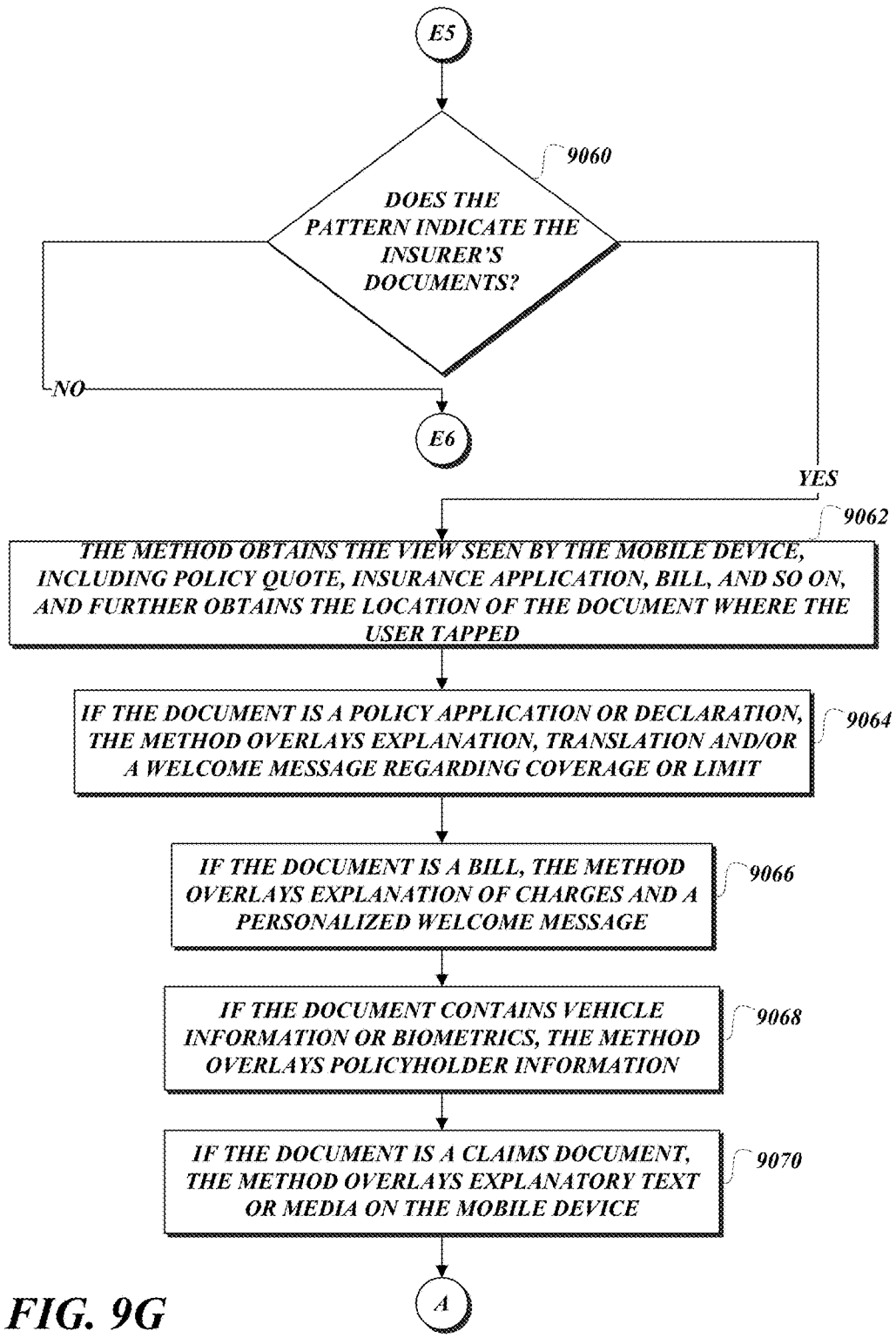
Figure 9H:
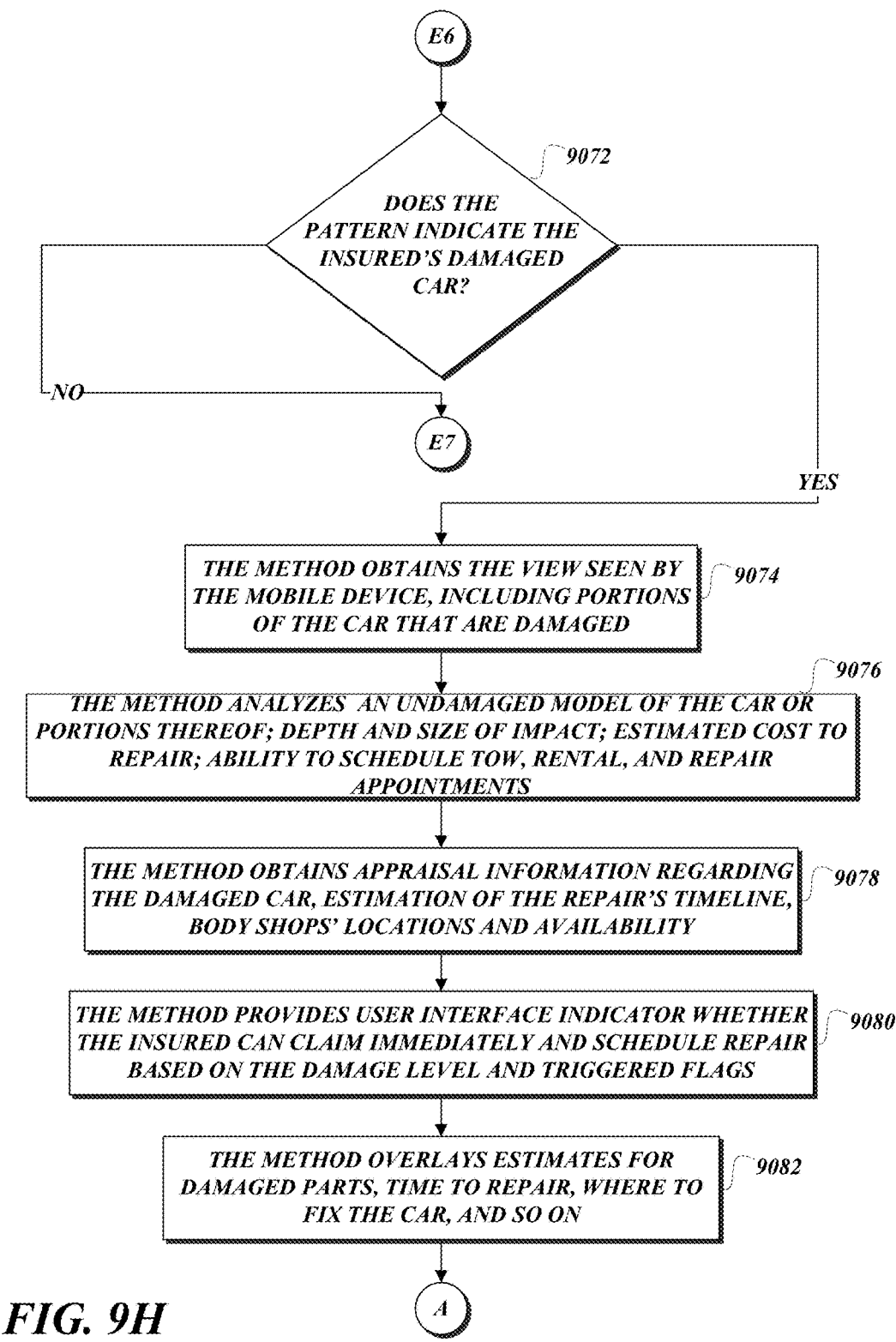
Figure 9I:
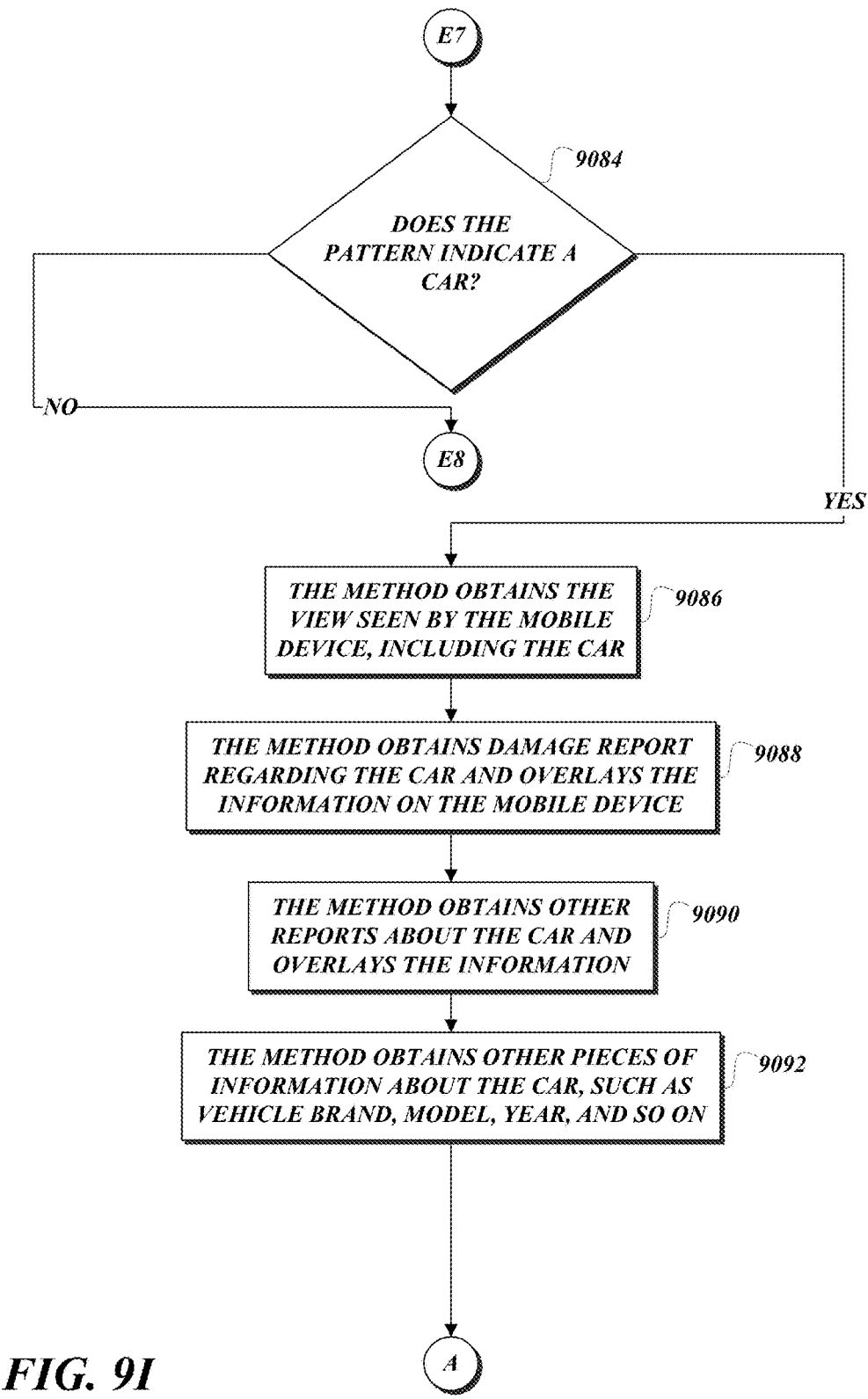
Figure 9J:
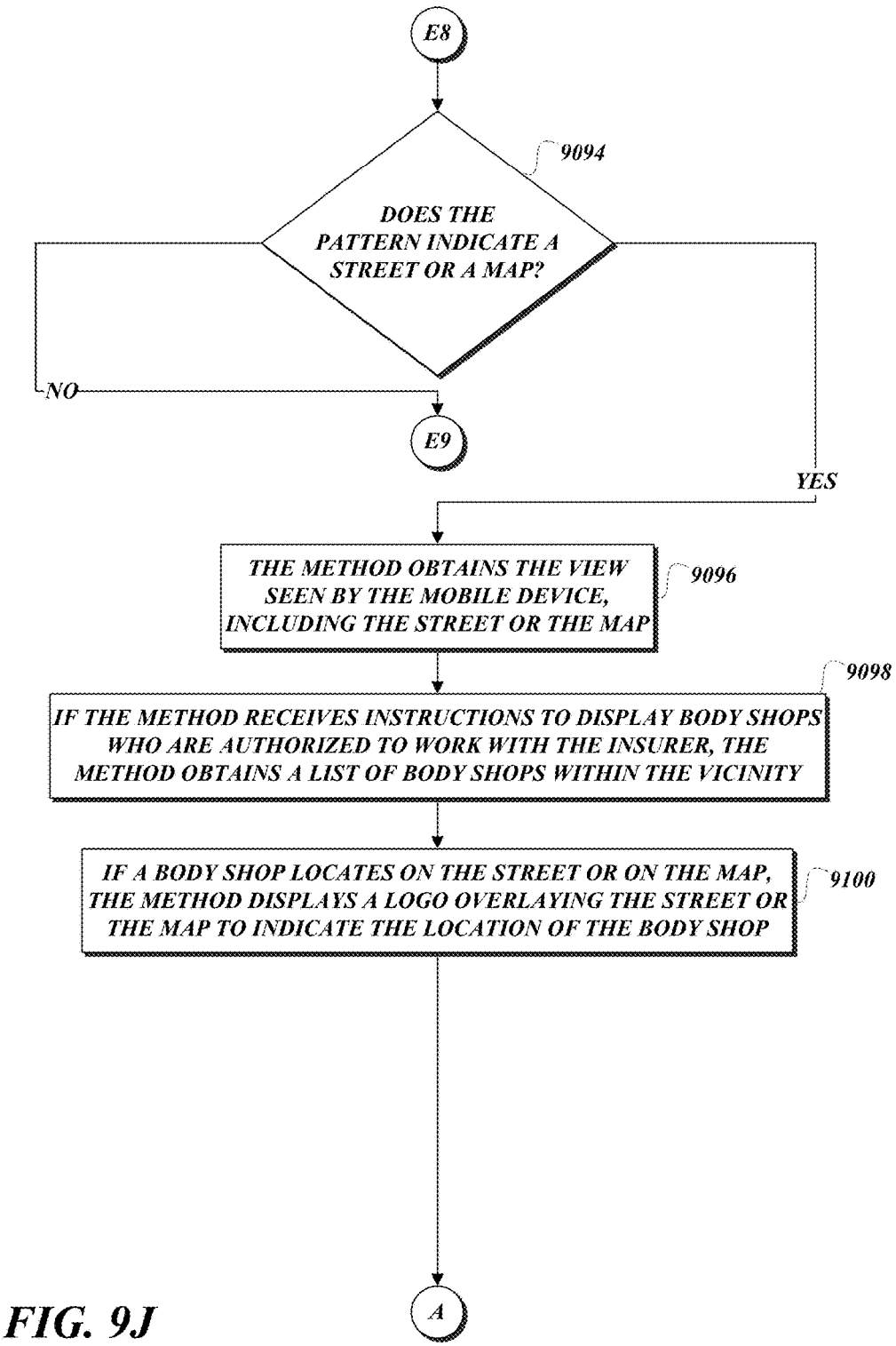
Figure 9K:
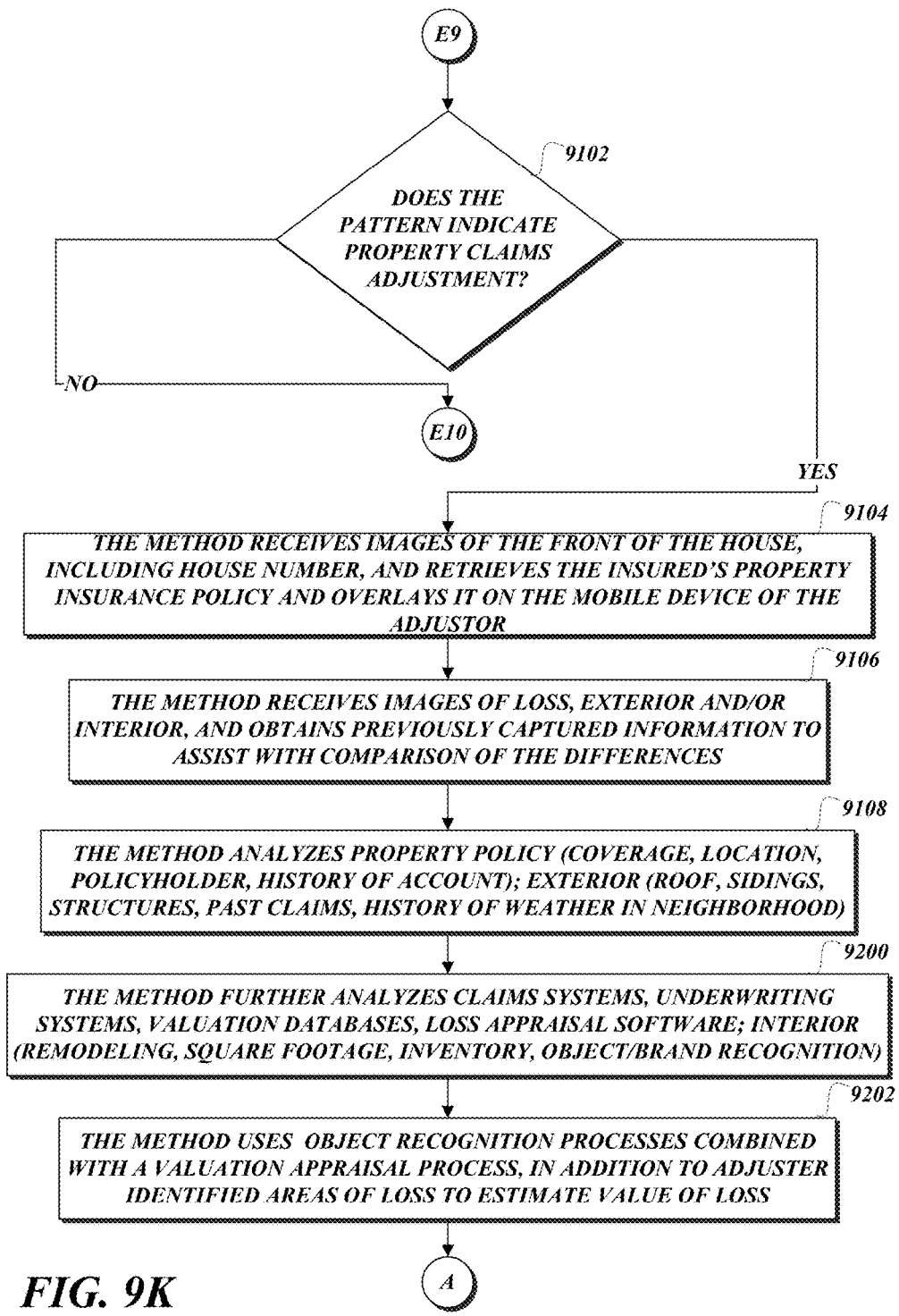
Figure 9L:
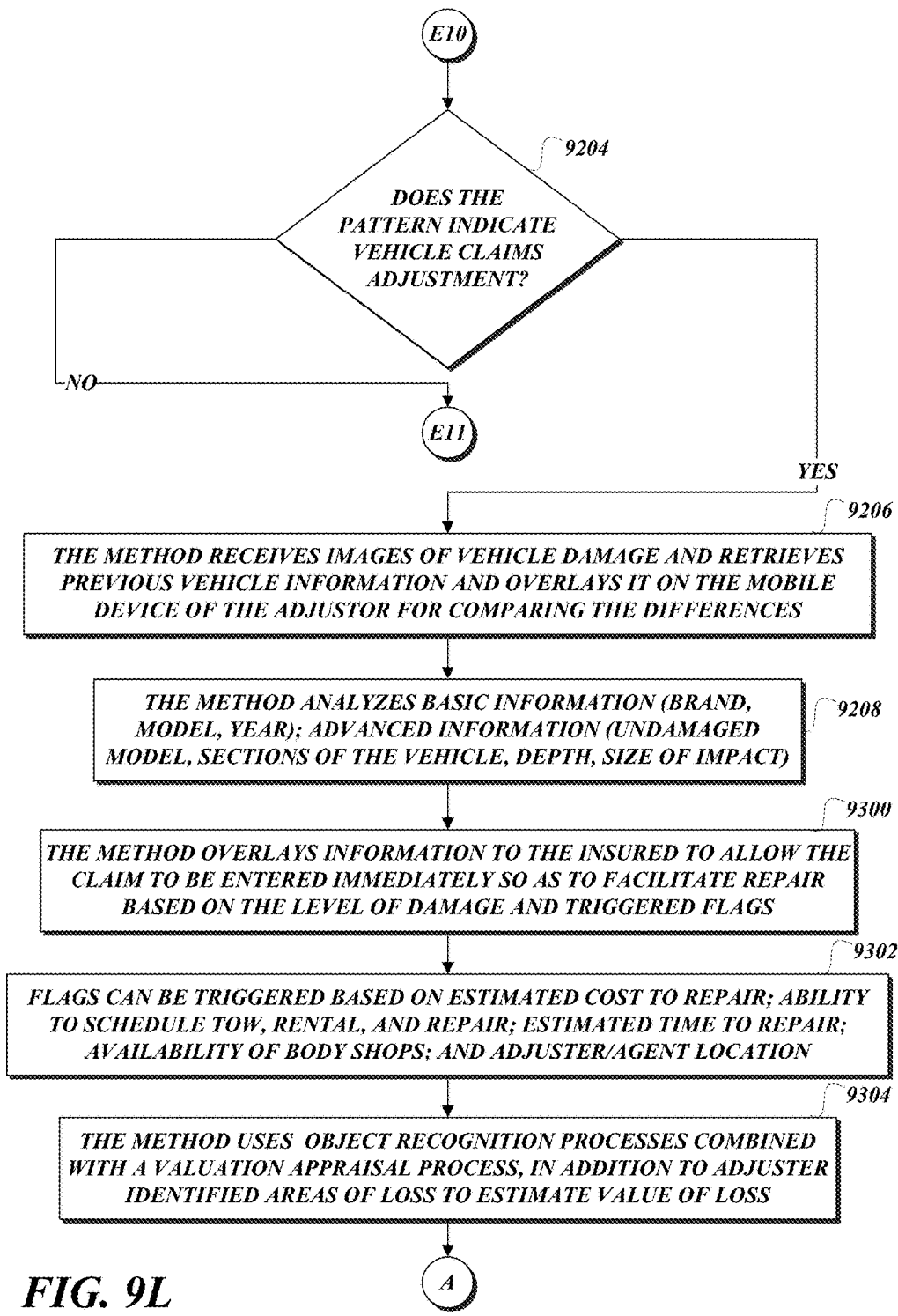
Figure 9M:
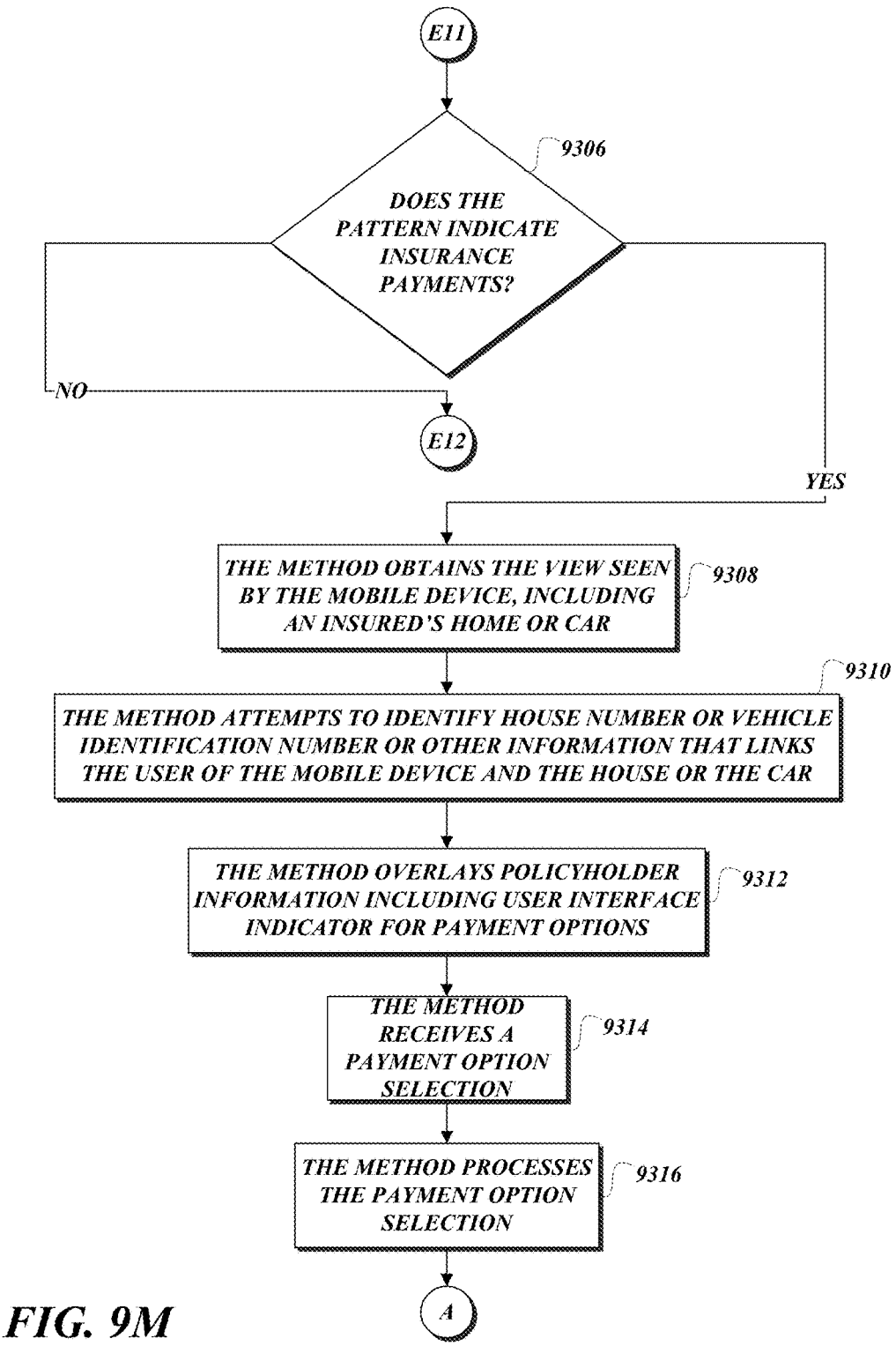
Figure 9N:
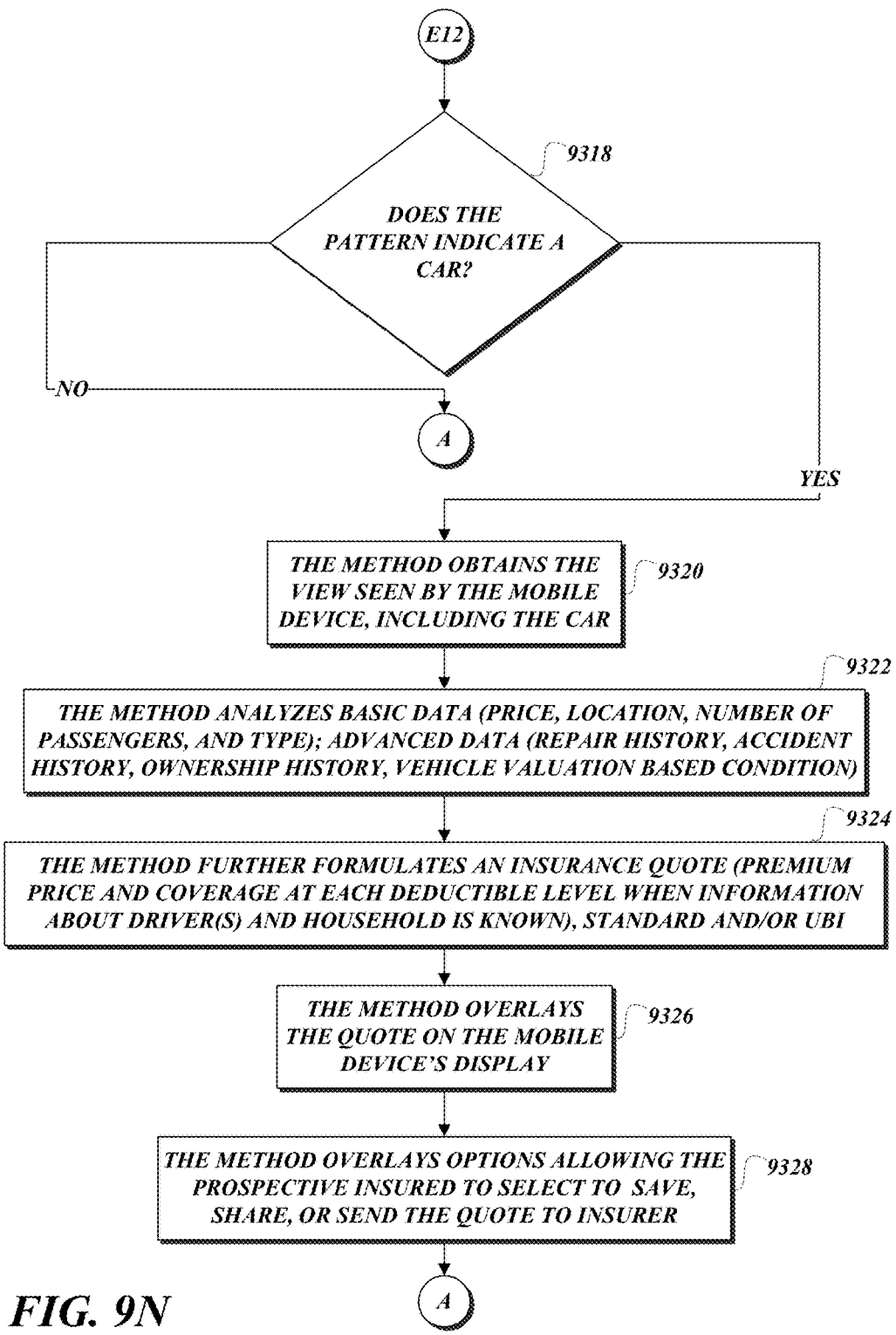

FIGS. 9A-9N are process diagrams implementing an exemplary method 9000 for facilitating augmented reality in insurance applications. From the start block, the method 9000 proceeds to a set of method steps 9002 defined between a continuation terminal ("terminal A") and another continuation terminal ("terminal B"). The set of method steps 9002 identifies patterns from data capture from a mobile device's camera. From terminal B (FIG. 9A), the method 9000 proceeds to a set of method steps 9004 defined between a continuation terminal ("terminal C") and another continuation terminal ("terminal D"). The set of method steps 9004 detects visual triggers from a view of the mobile device's camera, pointing at real life objects or scenes. From terminal D (FIG. 9A), the method 9000 proceeds to a set of method steps 9006, defined between a continuation terminal ("terminal E") and another continuation terminal ("terminal F"). The set of method steps 9006 uses analytics and visual triggers to identify overlaying contents and provides augmentation to the mobile device to facilitate interaction.

From terminal E (FIG. 9B), the method 9000 proceeds to decision block 9008, where a test is performed to determine whether the pattern indicates locating an insurer's office. If the answer to the test at decision block 9008 is no, the method proceeds to another continuation terminal ("terminal E1"). Otherwise, if the answer to the test at decision block 9008 is yes, the method proceeds to block 9010 where the method obtains the GPS of the mobile device. From block 9010, the method proceeds to block 9012, where the method obtains the view seen by the mobile device, including a map, a geographic location, a street, and so on. At block 9014, the method obtains the location of the insurer's offices. At block 9016, the method displays a logo where the insurer's offices are located in the view seen by the mobile device. The method then continues to terminal A and skips back to the above-identified processing steps.

From terminal E1 (FIG. 9C), the method proceeds to decision block 9018 where a test is performed to determine whether the pattern indicates quoting of auto insurance. If the answer to the test at decision block 9018 is no, the method proceeds to another continuation terminal ("terminal E2"). Otherwise, if the answer to the test at decision block 9018 is yes, the method proceeds to block 9020 where the method obtains the view seen by the mobile device, including the vehicle, an image of the vehicle, and a textual description of the vehicle. At block 9022, the method identifies the make, model, and year of the vehicle. At block 9024, the method obtains personal information entered on the mobile device. At block 9026, the method presents, via the mobile device, an auto insurance quote. The auto insurance quote is able to transition into a full quote which is purchasable if the user interacts with the mobile device to provide instructions to proceed.

The method 9000 may access a variety of sources of information to provide an auto insurance quote, such as online databases (e.g., carmax.com), OEM databases, or automotive appraisal systems (e.g., Audatex, or CCC One); advance vehicle information (e.g., vehicle repair history, vehicle accident history, ownership history, vehicle valuation based condition); and/or derived information from online databases (e.g., repairpal.com). The auto insurance quote presented as an augmentation on the mobile device may present premium price and coverage details at each deductible level when information about driver(s) and household is known. The quote could be a combination either for standard auto insurance or for usage-based insurance. The augmentation allows a quote to be saved, shared, or sent to the insurer, via interaction of the user. Personal information could be derived from the information above in addition to information directly given by the customer (e.g., entered manually or apprehended through information that has been previously entered into an insurance augmented reality application or taken from the mobile device.) The method then continues to terminal A and skips back to the above-identified processing steps.

From terminal E2 (FIG. 9D), the method 9000 proceeds to decision block 9028 where a test is performed to determine whether the pattern indicates quoting of property insurance. If the answer to the test at decision block 9028 is no, the method proceeds to another continuation terminal ("terminal E3"). Otherwise, if the answer to the test at decision block 9028 is yes, the method proceeds to block 9030 where the method obtains the view seen by the mobile device, including a home, and the location of the home. At block 9032, the method performs analytics over basic home information (price, location, number of rooms, type, and so on). At block 9034, the method performs analytics over advanced home information (age of roof, sidings, structures, remodeling, number and types of past claims, and so on). At block 9036, the method performs analytics over location information, such as weather conditions to which the home is susceptible. At block 9038, the method presents a property insurance quote and presents a user interface indicator which is selectable to electronically intermediate the insurer providing the quote.

The method 9000 analyzes various data repositories to provide information to determine pricing of the property insurance quote. The system analyzes basic home information derived from a combination of sites such as Trulia, Zillow, map sites (e.g., Google Maps, Apple Maps, Bing Maps); advanced home information derived from a combination of claims systems, underwriting systems and valuation databases; and location information. The property insurance quote is an augmentation that reveals premium price and coverage details at each deductible level, covered and non-covered occurrences (e.g., flood not included or is purchased separately.) The property insurance quote may contain riders for extra coverage on certain elements. The augmentation allows the quote to be saved, shared, or sent to the insurer. The information used to formulate the quote includes that which is derived in addition to information from the customer (entered manually, apprehended through information that has been previously entered into the augmented reality insurance application, or taken from the mobile device.) The augmentation facilitates the customer's ability to intermediate the insurer directly within the augmentation environment. The method then continues to terminal A and skips back to previously discussed processing steps.

From terminal E3 (FIG. 9E) the method proceeds to decision block 9040, where a test is performed to determine whether the pattern indicates a competitor insurer's document. If the answer to the test at decision block 9040 is no, the method proceeds to another continuation terminal ("terminal E4"). Otherwise, if the answer to the test at decision block 9040 is yes, the method proceeds to block 9042 where the method obtains the view seen by the mobile device, including a competitor insurer's insurance application, policy declaration, or bill. At block 9046, the method launches a media presentation on a mobile device to inform the user about the insurer. At block 9048, the method captures data on the competitor insurer's document to be analyzed by a quoting process. At block 9050, the method presents an insurance quote, and presents a user interface indicator, which is selectable to electronically intermediate the insurer providing the quote. The method then continues to terminal A, and skips back to previously discussed processing steps.

From terminal E4 (FIG. 9F), the method 9000 proceeds to decision block 9052 where a test is performed to determine whether the pattern indicates it is the insurer's marketing materials. If the answer to the test at decision block 952 is no, the method proceeds to another continuation terminal ("terminal E5"). Otherwise, if the answer to the test at decision block 9052 is yes, the method proceeds to block 9054 where the method obtains the view seen by the mobile device, including the insurer's marketing material, such as direct mail, magazine advertisements, billboards, television commercials, and so on. At block 9055, the method overlays an interactive marketing augmentation on the mobile device. At block 9056, the method receives instructions from the user of the mobile device. At block 9058, the method electronically intermediates the insurer or facilitates purchasing of insurance products on-line. The method then continues to terminal A and skips back to previously discussed processing steps.

From terminal E5 (FIG. 9G), the method 9000 proceeds to decision block 9060 where a test is performed to determine whether the pattern indicates the insurer's documents. If the answer to the test at decision block 9060 is no, the method proceeds to another continuation terminal ("terminal E6"). Otherwise, if the answer to the test at decision block 9060 is yes, the method proceeds to block 9062, where the method obtains the views seen by the mobile device, including insurance policy, application, bills, and so on. The method further obtains the location of the document where the user tapped. At block 9064, if the document is a policy application or declaration, the method overlays explanation, translation, and/or a welcome message regarding coverage or limit. At block 9066, if the document is a bill, the method overlays explanation of charges and a personalized welcome message. At block 9068, if the document contains vehicle identification information or biometrics, the method overlays policyholder information. At block 9070, if the document is a claims document, the method overlays explanatory text file or media on the mobile device. The method then continues to terminal A and skips back to previously discussed processing steps.

From terminal E6 (FIG. 9H), the method proceeds to decision block 9072, where a test is performed to determine whether the pattern indicates the insured's damaged car. If the answer to the test at decision block 9072 is no, the method continues to another continuation terminal ("terminal E7"). Otherwise, if the answer to the test at decision block 9072 is yes, the method proceeds to block 9074, where the method obtains the view seen by the mobile device, including portions of the car that are damaged. At block 9076, the method analyzes an undamaged model of the car or portions thereof; depth and size of impact; estimated cost to repair; and ability to schedule tow, rental and repair appointments. At block 9078, the method obtains appraisal information regarding the damaged car, estimation of the repair's timeline, body shops' locations and availability. At block 9080, the method provides a user interface indicator of whether the insured can claim immediately and schedule repair based on the damage level and triggered flags. At block 9082, the method overlays augmentation regarding estimates for damaged parts, time to repair, where to fix the car, and so on.

The method analyzes basic vehicle information (e.g., vehicle brand, model, year, and so on); derived information online databases (e.g., carmax.com); OEM databases; automotive appraisal systems (e.g., Audatex or CCC One); and advance vehicle information. The method recognizes damages to a vehicle by accessing three-dimensional models of an entire vehicle or sections of a vehicle to compare against the depth and size of impact derived from the three-dimensional model. The method 9000 then continues to terminal A and skips back to previously discussed processing steps.

From terminal E7 (FIG. 9I), the method proceeds to decision block 9084 where a test is performed to determine whether the pattern indicates a car. If the answer to the test at decision block 9084 is no, the method proceeds to another continuation terminal ("terminal E8"). Otherwise, if the answer to the test at decision block 9084 is yes, the method proceeds to block 9086 where the method obtains the view seen by the mobile device, including the car. At block 9088, the method obtains a damage report regarding the car and overlays the information on the mobile device. At block 9090, the method obtains other reports about the car (e.g., from Carfax or other providers) and overlays the augmentation. At block 9092, the method obtains other pieces of information about the car, such as vehicle brand, model, year, and so on. The method then continues to terminal A and skips back to previously discussed processing steps.

From terminal E8 (FIG. 9J), the method proceeds to decision block 9094 where a test is performed to determine whether the pattern indicates a street or a map. If the answer to the test at decision block 9094 is no, the method proceeds to another continuation terminal ("terminal E9"). Otherwise, if the answer to the test at decision block 9094 is yes, the method proceeds to block 9096 where the method obtains the view seen by the mobile device, including the street or the map. At block 9098, the method receives instructions to display body shops authorized to work with the insurer, and the method obtains a list of body shops within the vicinity. At block 9100, if a body shop is located on the street or on the map, the method displays a logo overlaying the street or the map to indicate the location of the body shop. The method then continues to terminal A and skips back to previously discussed processing steps.

From terminal E9 (FIG. 9K), the method proceeds to decision block 9102 where a test is performed to determine whether the pattern indicates property claims adjustment. If the answer to the test at decision block 9102 is no, the method proceeds to another continuation terminal ("terminal E10"). Otherwise, if the answer to the test at decision block 9102 is yes, the method proceeds to block 9104 where the method receives images of the front of the house, including house number, and retrieves the insured's property insurance policy and overlays it on the mobile device of the adjustor. At block 9106, the method receives images of loss, exterior and/or interior, and obtains previously captured information to assist with comparing the differences. At block 9108, the method analyzes property policy (coverage, location, policyholder, history of account) and exterior (roof, sidings, structures, past claims, history of weather in neighborhood.) At block 9200, the method further analyzes claims systems, underwriting systems, valuation databases, loss appraisal software and interior (remodeling, square footage, inventory, object/brand recognition.) At block 9202, the method uses insurance object recognition processes combined with a valuation appraisal process, in addition to adjustor-identified areas of loss to estimate value of loss.

Various pieces of information are analyzed by the method, including property policy information (e.g., coverage, location, policyholder, history of account); derived information from a combination of sites such as Trulia, Zillow, mapping sites (e.g., Google Maps, Apple Maps, Bing Maps); insurer's system (claims, underwriting, and so on); exterior home information (e.g., age of roof, sidings, other structures, history of past claims, history of inclement weather in neighborhood); derived information from a combination of claims systems, underwriting systems, valuation databases, loss appraisal software (e.g., Xactimate or Symbility), weather databases; previously captured visual data; interior home information (e.g., remodeling, square footage measurement, inventory capture, object/brand recognition); derived information from a combination of electronic goods/home goods valuation databases (e.g., MSB, Home Depot, Lowes, Xactware, and so on); and home inventory information. The method then continues to terminal A and skips back to previously discussed processing steps.

From terminal E10 (FIG. 9L), the method proceeds to decision block 9204 where a test is performed to determine whether the pattern indicates vehicle claims adjustment. If the answer to the test at decision block 9204 is no, the method continues to another continuation terminal ("terminal E11"). Otherwise, if the answer to test at decision block 9204 is yes, the method proceeds to block 9206 where the method receives images of vehicle damage and retrieves previous vehicle information and overlays it on the mobile device of an adjustor for comparing the differences between the damaged vehicle and the previous state of the vehicle. At block 9208, the method analyzes basic information (brand, model, year) and advanced information (undamaged model, sections of the vehicle, depth, size of impact.) At block 9300, the method overlays augmentation to inform the insured if the claim may be entered immediately so as to facilitate repair based on the level of damage and triggered flags. At block 9302, flags can be triggered based on estimated cost to repair; ability to schedule towing, rental, and repair; estimated time to repair; availability of body shops; and adjustor/agent location. At block 9304, the method uses object recognition processes combined with a valuation appraisal process in addition to adjustor-identified areas of loss to estimate value of loss. The method then continues to terminal A and skips back to previously discussed processing steps.

From terminal E11 (FIG. 9M), the method proceeds to decision block 9306 where a test is performed to determine whether the pattern indicates insurance payments. If the answer to the test at decision block 9306 is no, the method proceeds to another continuation terminal ("terminal E12"). Otherwise, if the answer to the test at decision block 9306 is yes, the method proceeds to block 9308 where the method obtains the view seen by the mobile device, including an insured's home or car. At block 9310, the method attempts to identify a house number or vehicle identification number or other information that links the user of the mobile device to the house or the car. At block 9312, the method overlays policyholder information, including user interface indicator for payment options. At block 9314, the method receives a payment option selection. At block 9316, the method processes the payment option selection. The method then continues to terminal A and skips back to previously discussed processing steps.

From terminal E12 (FIG. 9N), the method proceeds to decision block 9318 where a test is performed to determine whether the pattern indicates a car. If the answer to the test at decision block 9318 is no, the method proceeds to terminal A and skips back to previously discussed processing steps. Otherwise, if the answer to the test at decision block 9318 is yes, the method proceeds to block 9320 where the method obtains the view seen by the mobile device, including the car. At block 9322, the method analyzes basic data (price, location, number of passengers, and type) and advanced data (repair history, accident history, ownership history, vehicle valuation-based condition.) At block 9324, the method further formulates an insurance quote (premium price and coverage at each deductible level when information about driver[s] and household is known), standard and/or usage-based insurance. At block 9326, the method overlays the quote on the mobile device's display. At block 9328, the method overlays options allowing the prospective insured to select to save, share, or send the quote to the insurer. An augmentation facilitates intermediating an insurer directly if the user of the mobile device were to select an electronic option to contact the insurer directly. The method then continues to terminal A and skips back to previously discussed processing steps.

While illustrative embodiments have been illustrated and described, it will be appreciated that various changes can be made therein without departing from the spirit and scope of the invention.

The embodiment of the invention in which an exclusive property or privilege is claimed are defined as follows:

1. A method comprising:
   displaying a live view captured by a digital camera of a mobile device of a user;
   tracking, by the mobile device, the displayed live view;
   triggering, by the mobile device, on insurance objects located within the displayed live view;

receiving input, by the mobile device, when the user interacts with an augmentation overlaying the displayed live view; and facilitating the augmentation on a display of the mobile device, the augmentation including an office locator, an application to quote and to allow purchasing of car insurance, an application for property insurance quote and purchase, an application for providing competitive information, an application for enhancing physical marketing material of an insurer by overlaying an interactive marketing experience on the displayed live view of any of the insurer's physical marketing materials, an application for insurance document explanation and/or translation, an application for identifying insurance coverage gaps and communicating them to the user, an application for interacting with the displayed live view of a physical insurance form with a mobile device in an appraisal scenario connected with a damaged vehicle, an application for locating a body shop, an application for providing property claims adjustments, and an application for insurance payment options.

2. The method of claim 1, wherein facilitating the augmentation of an application for an office locator includes displaying a logo where an insurer's office is located in the live view.

3. The method of claim 1, wherein facilitating the augmentation of an application to quote and to allow purchasing of car insurance includes identifying the make, model, and year of a vehicle appearing in the live view and presenting an auto insurance quote on the display of the mobile device, which is purchasable by interacting with the mobile device to proceed.

4. The method of claim 1, wherein facilitating the augmentation of an application for property insurance quote and purchase includes performing analytics overlaying basic home information, advanced home information, and location information including weather conditions to which a home is susceptible, wherein facilitating includes a user interface indicator selectable to electronically intermediate with the insurer.

5. The method of claim 1, wherein facilitating the augmentation of an application for providing competitive information includes determining a competitor insurer's document, capturing data of the competitor insurer's document, and analyzing by a quoting process to present an insurance quote on the display of the mobile device.

6. The method of claim 1, wherein facilitating the augmentation of an application for enhancing physical marketing material of the insurer includes overlaying a marketing augmentation on the display of the mobile device and intermediating with the insurer to facilitate purchasing an insurance product.

7. The method of claim 1, wherein facilitating the augmentation of an application for insurance document explanation and/or translation includes obtaining a location on a document where it was tapped to overlay explanation or translation.

8. The method of claim 1, wherein facilitating the augmentation of an application for appraising a damaged vehicle includes analyzing an undamaged model of the vehicle, depth and size of impact, estimated cost to repair, ability to schedule tow, rental, and repair appointments, and facilitating an insured to immediately claim and schedule repair based on the damage level and triggered flags.

9. The method of claim 1, wherein facilitating the augmentation of an application for locating a body shop includes displaying body shops authorized to work with the insurer by displaying a logo overlaying the map where they are located.

10. The method of claim 1, wherein facilitating the augmentation of an application for property claims adjustment includes receiving images of the front of a house, including house number, and retrieving the insured's property insurance policy connected with the house and overlaying it on the display of the mobile device.

11. The method of claim 1, wherein facilitating the augmentation of an application for insurance payment options includes identifying a house number or a vehicle identification number and other information that links to a user of the mobile device and presenting user interface indicator for payment options.

12. The method of claim 1, wherein facilitating the augmentation further comprises an application for reporting previous damage to a car by overlaying visual indicators on the live view of the car where previous damage is located.

13. A computer-readable medium which is non-transitory, having stored thereon computer-readable instructions configured to be executed by a computer for implementing a method, comprising:

displaying a live view captured by a digital camera of a mobile device of a user;

tracking, by the mobile device, the displayed live view;

triggering, by the mobile device, on insurance objects located within the displayed live view;

receiving input, by the mobile device, when the user interacts with an augmentation overlaying the displayed live view; and facilitating the augmentation on a display of the mobile device, the augmentation including an office locator, an application to quote and to allow purchasing of car insurance, an application for property insurance quote and purchase, an application for providing competitive information, an application for enhancing physical marketing material of an insurer by overlaying an interactive marketing experience on the displayed live view of any of the insurer's physical marketing materials, an application for insurance document explanation and/or translation, an application for identifying insurance coverage gaps and communicating them to the user, an application for interacting with the displayed live view of a physical insurance form with a mobile device in an appraisal scenario connected with a damaged vehicle, an application for locating a body shop, an application for providing property claims adjustments, and an application for insurance payment options.

* * * * *